United States Patent
Poirier et al.

(10) Patent No.: US 12,210,737 B2
(45) Date of Patent: Jan. 28, 2025

(54) ADJUSTABLE VALUE SELECTION USER INTERFACE CONTROL WITH DEPENDENT CONTROL

(71) Applicant: Shopify Inc., Ottawa (CA)

(72) Inventors: Eric Jean Poirier, Ottawa (CA); Maude Trudeau, Quebec (CA); Omas Abdullah, Kitchener (CA); Christopher Bossier, Chatham (CA)

(73) Assignee: Shopify Inc., Ottawa (CA)

( * ) Notice: Subject to any disclaimer, the term of this patent is extended or adjusted under 35 U.S.C. 154(b) by 32 days.

(21) Appl. No.: 18/059,134

(22) Filed: Nov. 28, 2022

(65) Prior Publication Data
US 2024/0176475 A1    May 30, 2024

(51) Int. Cl.
*G06F 3/04847*    (2022.01)

(52) U.S. Cl.
CPC .................. *G06F 3/04847* (2013.01)

(58) Field of Classification Search
CPC .................................................. G06F 3/04847
See application file for complete search history.

(56) References Cited

U.S. PATENT DOCUMENTS

| | | | |
|---|---|---|---|
| 2003/0122874 A1* | 7/2003 | Dieberger ............ | G06F 16/904 715/764 |
| 2010/0100440 A1* | 4/2010 | Nickelson, III ....... | G06Q 30/02 707/E17.108 |
| 2019/0306348 A1* | 10/2019 | Dandoko ............ | G06F 3/04883 |
| 2021/0124482 A1* | 4/2021 | Lindstr?M ............ | G16H 20/40 |
| 2022/0095440 A1* | 3/2022 | Van Der Sloot ..... | H05B 47/175 |

OTHER PUBLICATIONS

Poirier, Eric; The Engineering Story Behind Flex Comp; https://shopify.engineering/building-flex-comp; Oct. 5, 2022; retrieved from the Internet Jul. 19, 2023.
Shopify; Rewriting the story of compenstation; https://news.shopify.com/rewriting-the-story-of-compensation; Sep. 16, 2022; retrieved from the Internet Jul. 19, 2023.
The Globe and Mail; Shopify to launch 'Flex Comp' sofrware, giving employees choice in mix of cash and equity paid; Sep. 16, 2022; https://www.theglobeandmail.com/business/article-shopify-to-give-employees-more-choice-in-mix-of-cash-and-equity-paid/; retrieved from the Internet Jul. 19, 2023.
https://cdn.uc.assets.prezly.com/bbee93e6-5864-4875-9092-ec1e5d8df386/gif2video/-/quality/best/-/format/webm/; Sep. 16, 2023; Retrieved from the Internet Jul. 19, 2023.
Koike, Yuichi et al.; TimeSlider: An Interface to Specify Time Point; UIST'97: Proceedings of the 10th Annual ACM Symposium on User Interface Software and Technology; Oct. 1997; pp. 43-44; https://dl.acm.org/ doi/10.1145/263407.263507.

* cited by examiner

*Primary Examiner* — Kc Chen
(74) *Attorney, Agent, or Firm* — CPST Intellectual Property Inc.; Brett J. Slaney

(57) ABSTRACT

A user interface control is provided. The user interface control extends between a first display position and a second display position and defines a track. The extent of the track corresponds to a range of values, the user interface control having a manipulable portion and a non-manipulable portion, wherein a selector is movable along the track within the manipulable portion to select a value within an allowable subrange of the range of values. The allowable subrange is based on a limit defining an extent of the allowable subrange and the non-manipulable portion corresponding to a portion of the range of values beyond the limit.

23 Claims, 16 Drawing Sheets

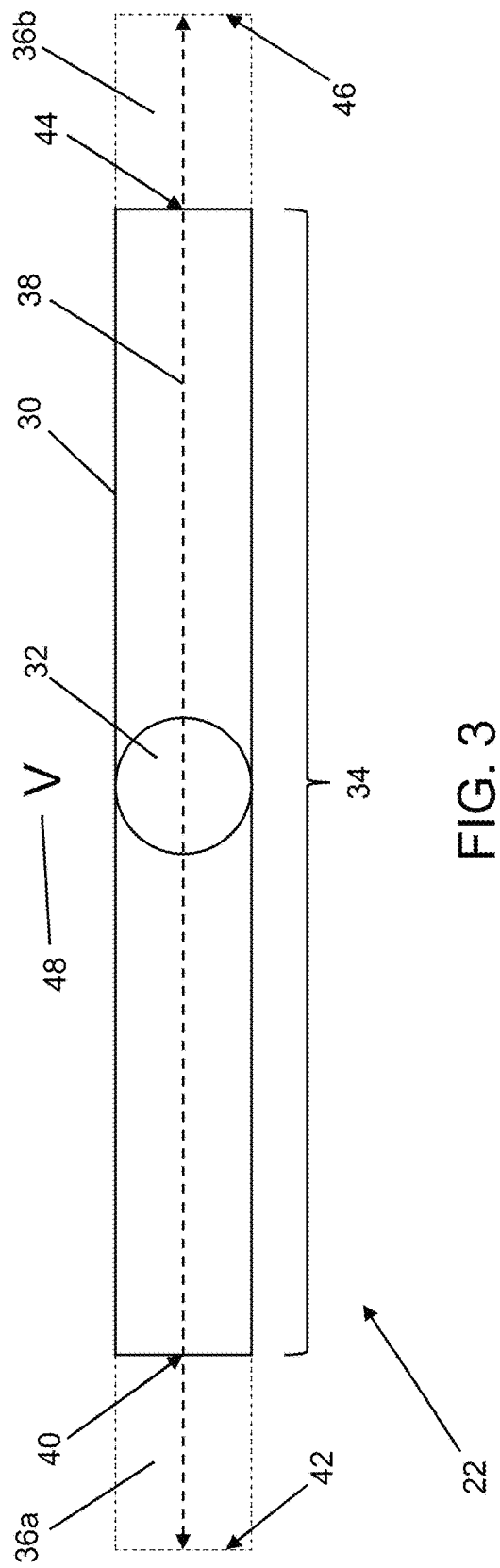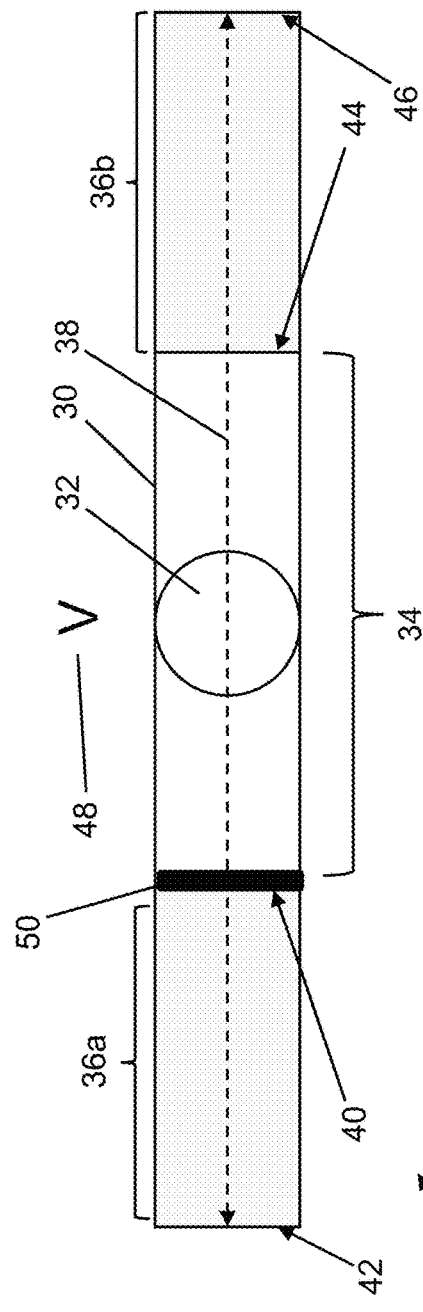
FIG. 3
FIG. 4

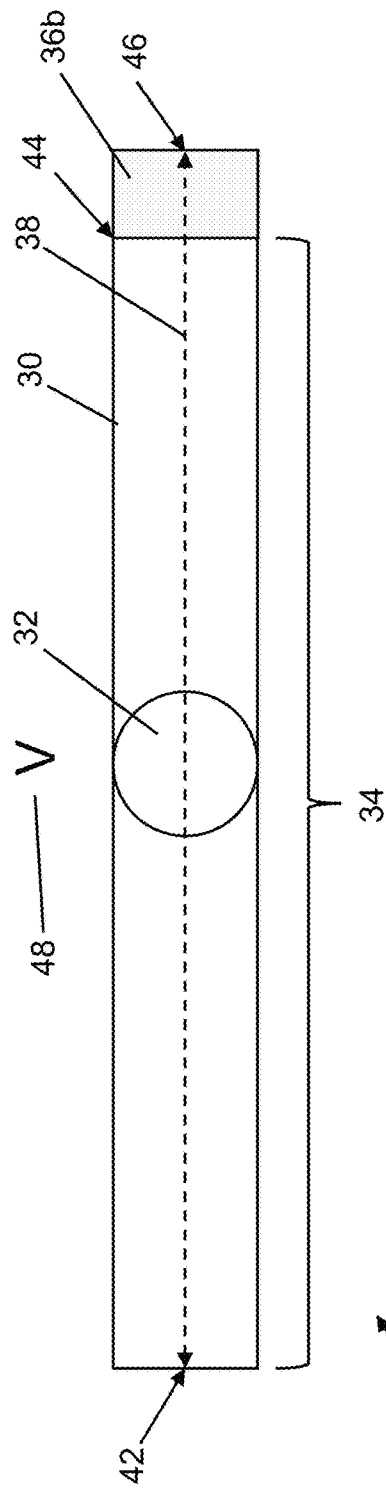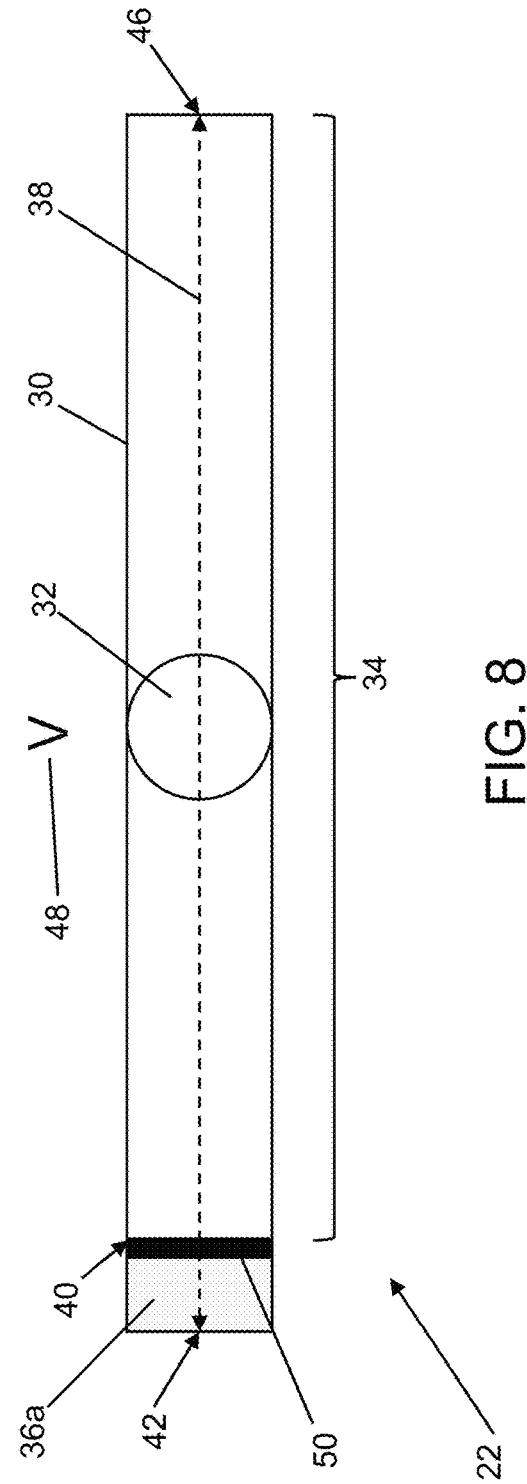
FIG. 7
FIG. 8

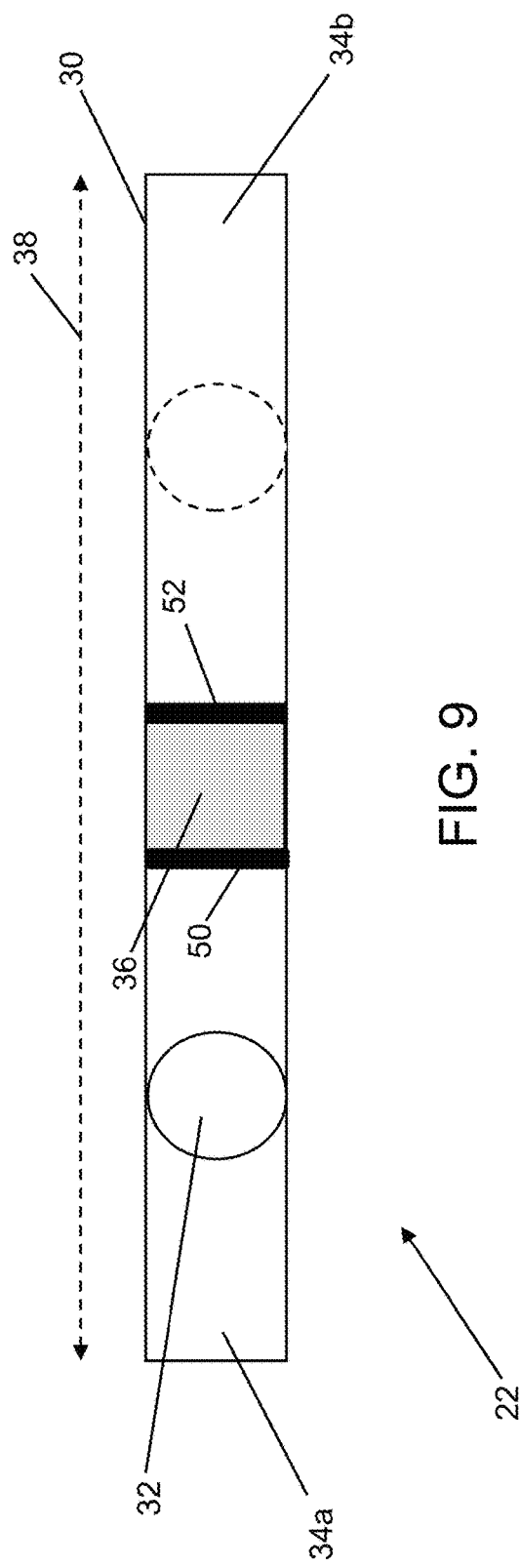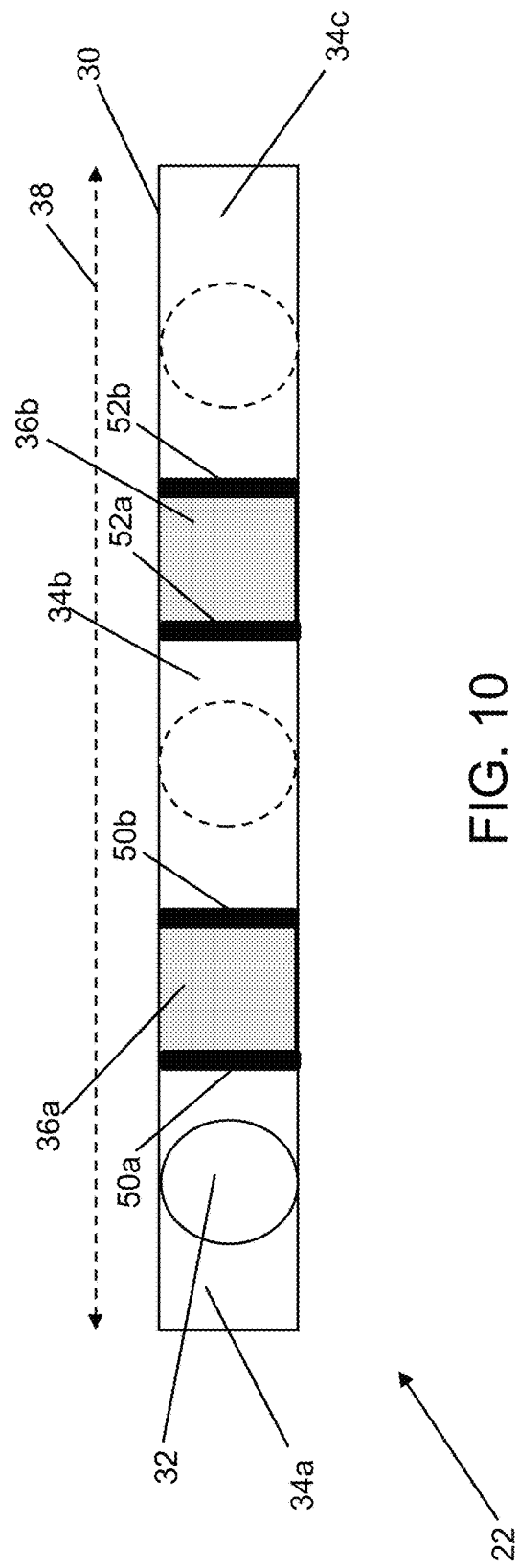

ADJUSTABLE VALUE SELECTION USER INTERFACE CONTROL WITH DEPENDENT CONTROL

TECHNICAL FIELD

The following relates generally to user interface (UI) controls, in particular to user interface controls extending between display positions and defining a track, to user interface controls having manipulable and non-manipulable portions, and yet more particularly to user interface controls having a selector movable along the track within the manipulable portion.

BACKGROUND

User interfaces (UIs) may be presented or displayed by computing devices for various purposes, including to graphically display content to a user on a display (e.g., that is on or controlled by the computing device), as well as to provide interactive control to the user, e.g., to allow the user to provide inputs to an application or a system associated with the computing device. There are a number of UI controls that can be used in UIs, for example, drop-down menus, text entry boxes, radio buttons, selectable buttons, checkboxes, dials, sliders, and the like. UI controls can be used to permit the user to provide a particular input to the computing device, via the UI. For example, UI controls that include a slider can allow a user to input a value by sliding a selector along a track to choose a value in a range of values defined by a minimum value and a maximum value.

BRIEF DESCRIPTION OF THE DRAWINGS

Embodiments will now be described with reference to the appended drawings wherein:

FIG. 3 shows an example of a slider UI control having upper and lower limits within a range of values having a minimum value and a maximum value.

FIG. 4 shows an example of a slider UI control having non-manipulable portions outside of upper and lower limits within a range of values.

FIG. 7 shows an example of a slider UI control having a non-manipulable portion outside of an upper limit in a range of values.

FIG. 8 shows an example of a slider UI control having a non-manipulable portion outside of a lower limit in a range of values.

FIG. 9 shows an example of a slider UI control having an inner non-manipulable portion.

FIG. 10 shows an example of a slider UI control having multiple inner non-manipulable portions.

DETAILED DESCRIPTION

Figure 1A:
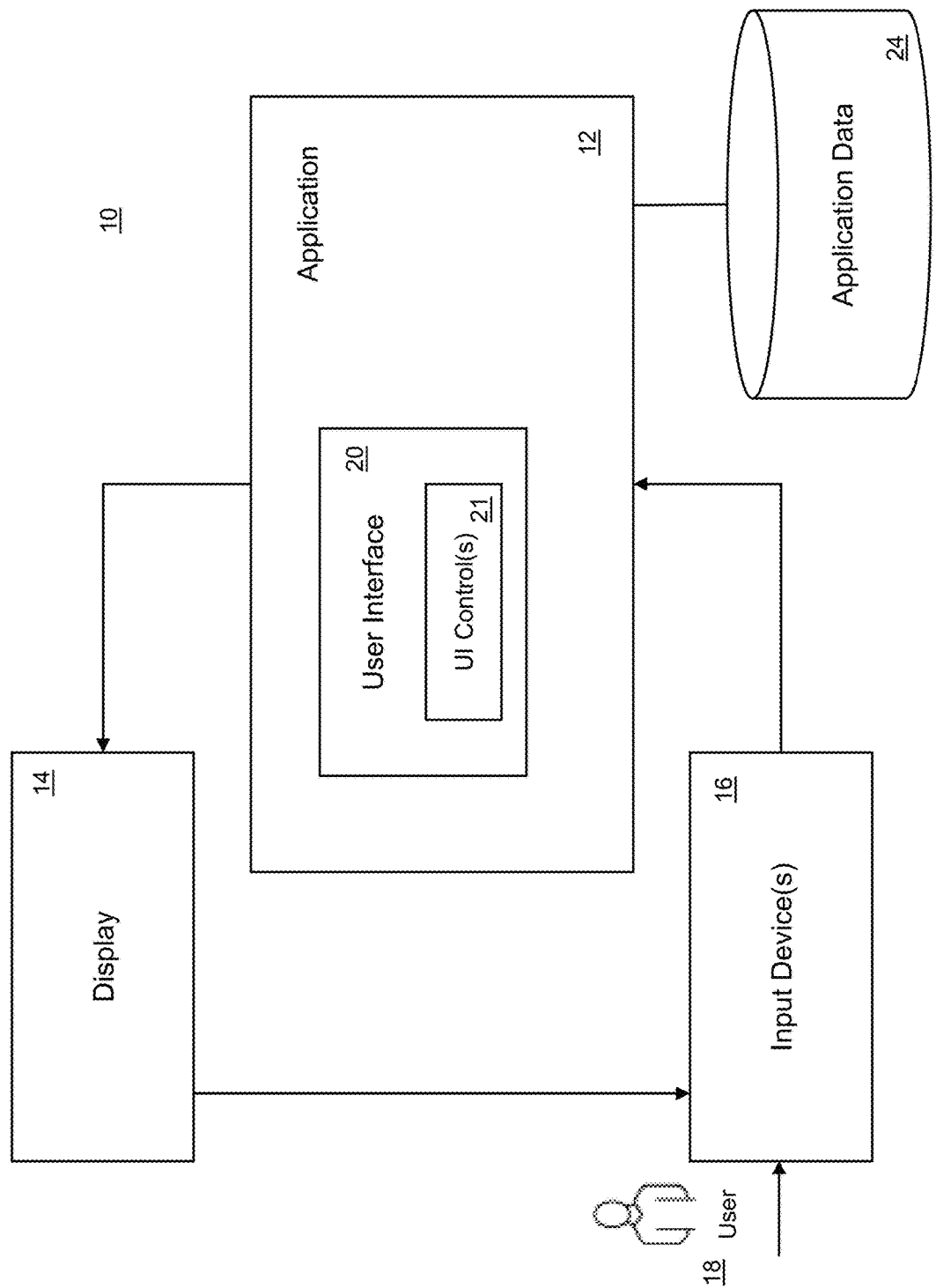
FIG. 1a is an example of a computing environment in which an application having a UI is provided.

UIs may include one or more components to enable a user to interact with the application and/or a connected or underlying system via the UI. One example of a UI component is a UI control, which permits a user to interact with the UI to make a selection that can provide an input to the application or system via the UI control. For example, a slider UI control may provide an intuitive manner of selecting values in a range of values. The slider UI control may additionally allow users to visualize their current selection from within the available range of values. It can be appreciated that while certain examples provided herein may refer to a slider-type UI control (referred to herein as a "slider UI control"), the principles can be applied to other selectable/manipulable UI controls, such as a selectable "progress" bar without a distinct slider element provided as the selector.

The UI control may further include one or more text fields to allow users to manually enter values to make granular modifications to their selections, which can in turn adjust the selector (e.g., a slider element of a slider UI control). These text fields may additionally provide an accessibility advantage in that users that find manipulation of the UI control to be difficult, can use the text fields as another input mechanism to select a position on the UI control. That is, the user may type a specific value in the text field that positions the selector of the UI control according to the entered value. The visualized value (that has been selected from the range of values using the UI control) may provide a value in the range of values, a proportion or percentage of the upper end of the range of values, or both. For example, when providing a UI control to obtain a selection, the selection may be associated with a selected value such as a temperature or volume level, or a proportion (e.g., percentage) of a total value allocated to one option or another option.

The UI control may additionally be configured to have limits placed on the values selectable from the UI control. The limits may be accounted for and communicated to the user in a way that is intuitive and readily understandable. It may be desirable to restrict the selectable values in a UI control to a sub-range of values that is not what may be expected to be the entire range of values. For example, a UI control used to select a volume level when an earphone is connected may include a maximum permitted output (e.g., when the earphone is connected) that is lower than the actual maximum volume level that a speaker is capable of outputting. In another example, a UI control used to select an airflow value may include a minimum value that is greater than a zero flow and a maximum value that is less than the actual maximum airflow that a fan is capable of outputting, to ensure that no-flow and max-flow conditions are avoided.

The lowest and highest extents that are displayed within, and selectable from, the UI control (i.e., what is selectable in the visual control space) can correspond to the limits in the range of values, rather than the expected or theoretical minimum and maximum values in the range of values (i.e., the range of values in the underlying numerical space corresponding to the values represented in the UI control). For example, if a volume control is limited to a maximum of 80% output or volume level 8 out of 10, the values selectable from the UI control may include zero to 80% or zero to 8. In this way, the user can be restricted to selecting only the permitted values in that circumstance.

If the expected or theoretical minimum and maximum values in the range of values are to be included in the visual control space by being represented in the UI control, the values outside of the limit(s) can be included in what is displayed in the UI control, while restricting or inhibiting the ability to select within a region defined by the values outside of the limit(s), by having both manipulable and non-manipulable portions of the UI control along a track that is included in the visual control space of the UI control. The manipulable portion(s) of the UI control along the track may correspond to selectable values (i.e., within limits), whereas the non-manipulable portion may correspond to unselectable values (i.e., values outside limits). The values outside of the limits may include, for example, values between the minimum in the range of values and the lower limit, and/or values between the upper limit and the maximum in the range of values. In the audio control example above, a visual identifier such as a guardrail can be placed at the upper limit of audio level 8, or a non-manipulable portion of the audio control can be blurred or otherwise visually distinguishable from the manipulable portion that includes audio levels 0 through 8.

By visually distinguishing the non-manipulable portion of the UI control by placing guardrails, limit identifiers, and/or bumpers on the track, or by otherwise visually identifying the visual control space occupied by at least one non-manipulable portion of the UI control, the user may intuitively visualize which selections are possible and which are not, and thus the limits placed in the UI control can be more easily understood. Depending on where the limits are placed, and consequently how much of the expected or theoretical range of values (i.e., between a minimum value and a maximum value in the range of values) is unavailable for selection, the amount of the UI and thus corresponding screen space available to the manipulable portion of the UI control and the selectable values in a sub-range of values defined between the limits (if any) may be minimized, and such screen space underutilized. For example, if the range of values extends between zero and one hundred, and a lower limit is placed at 35%, only 65% of the UI control would be available to the user for making selections. If there are both upper and lower limits (e.g., a 35% lower limit and a 75% upper limit) the proportion of the UI control available is even further reduced. Moreover, in some cases, the manipulable range in the UI control may be user- or item-specific, e.g., in the case of selecting the length of an object being resized in a computer-aided drawing (CAD) UI, objects with relatively longer real-world dimensions (scaled within the CAD UI) may be more difficult to resize with accuracy compared to relatively smaller objects if linearly spaced limits are used, as a greater number of selectable values would be placed into the same manipulable portion as those with a relatively shorter range of selectable lengths.

A non-proportionate placement of limits within a UI control (e.g., a slider UI control) can be employed to increase the size of the manipulable portion of the UI control (i.e., the portion that is allocated to an underlying range of values from the numerical space that are selectable using the UI control in the visual control space) as compared to a proportionate placement of limits. This may be done by defining a minimum proportion of the UI control that is to be dedicated to the manipulable portion and rescaling the amount of screen space allocated to the non-manipulable portion, which constrains the spacing (also referred to herein as the "incrementation") of underlying values that fall within the non-manipulable portion. For example, a UI control may be presented so as to extend between a first display position and a second display position to define a track. The extent of the track may correspond to a range of values and the track can include a manipulable portion and a non-manipulable portion.

It can be appreciated that while certain example embodiments described herein identify a range and/or subrange of values that are, or contain, linear sequences (e.g., 1, 2, 3, 4), the (sub)range of values may be, or contain, non-linear sequences (e.g., geometric, exponential, logarithmic, sequences effecting an ease-in or ease-out or easy-ease, etc.).

A selector may additionally be presented (e.g., a slider element or component), which is movable along the track within the manipulable portion to select a value within an allowable subrange of the range of values. The subrange of values may be defined by at least one limit (e.g., a lower limit, an upper limit, or both upper and lower limits). The limit(s) define an extent of the allowable subrange and the non-manipulable portion corresponds to a portion of the range of values that are beyond the limit(s).

The limit(s) may be presented visually, e.g., using a guardrail or other visually distinguishable element such as a bumper or by using an effect, such as blurring, shading, the use of different color(s), etc. To utilize a greater proportion of the track provided in the UI control, and thus corresponding screen space, the manipulable portion may be presented using a different scale with a different proportion of screen space (allocated to representing the underlying values that can be selected) than the proportion of screen space allocated to the non-manipulable portion (and those underlying values). That is, the non-manipulable portion(s) may represent corresponding values beyond the corresponding limit(s) with a different scale (e.g., different incrementation such as number and/or spacing of values along the track) or other proportion of the available screen space for the UI control, than what is used for the manipulable portion. For example, a non-manipulable portion representing 30% of the values in the range of values can be rescaled to fit within 10% of the track, allowing the allowable subrange of the range of values (i.e., those values represented by the manipulable portion) to benefit from an additional 20% of the track to present those values (i.e., 90% instead of the 70% of a proportionate spacing scenario). In this way, greater granularity, control, and screen space may be provided to enhance the user experience when compared to a proportionate scaling of values in both the manipulable portion and the non-manipulable portion. The proportions dedicated to the manipulable and non-manipulable portions can vary based on the application, the size of the UI control, the screen size of the device being used to display the UI control, among other factors.

The proportions, the limits, the range of values and the allowable sub-range of values allocated to be represented within, and selectable from, the manipulable portion (according to the limits), may be provided as inputs to a UI and can be adapted from data sets provided by separate systems. For example, a management system within an enterprise may provide data that is used to set the parameters for the UI control based on an instance, user, or other context relevant to the application. Any such determinations may vary from application to application or user to user and may be set according to thresholds, tiers, user types, or other factors such as environmental limitations (e.g., aforementioned screen size, number of UI controls, and the like). In an example embodiment, inputs to the UI control may be rounded in increments (e.g., 10, 100, 1,000, 10,000, etc.) to align an input to an allowable increment depending on the application. Such rounding can be advantageous where users are less likely to select intermediate values (i.e., values between the increments). Additionally or alternatively, this can make selections relatively smoother by making it easier to align a selector element such as a slider with a chosen value as compared with, for example, allowing many finer increments to be selected. The UI control may include text entry boxes to permit a user to enter a value. Notably, where inputs are rounded to defined increments/steps as discussed, such a text entry box could be usable to allow entry of a more precise (i.e., unrounded) value such as a finer increment.

The UI control may be adapted to provide multiple UI controls. When providing multiple UI controls, one UI control may impose a dependency on a selection made in another of the UI controls. For example, a first UI control can be presented along with a second UI control. The second UI control may be configured to be dependent, to rely on, or to otherwise be impacted by a selection from the first UI control. For example, a selection made using the first UI control may impact an upper limit imposed on the second UI control wherein a further selection of a different type or category can be made using the second UI control. The UI controls may be provided in groups that include any two or more UI controls that provide independent or related features. The UI controls may be provided with at least one pair of UI controls that includes a dependency such that a selection in a first UI control is required before a selection can be made in a second UI control, e.g., where the second UI control receives an input from the first UI control to define the range of values, the minimum or maximum in such a range of values, limits placed within the range of values, etc.

The UI control may be configured to incorporate two units on the same track. For example, one side of the track may be associated with a first unit while the opposite side of the track may be associated with a second unit. The first and second units together may amount to another unit or value that represents the sum of the first and second units. In this way, moving a selector on the track dynamically impacts the proportion of the sum allocated to each of the first and second units. In such a configuration, moving the selector along the track visually depicts such proportions based on the extent of the track on either side of the selector. In some example embodiments, moving the slider in a UI control may increase or decrease the sum of the first and second units (e.g., because the second unit is subject to some sort of multiplier or premium or adjustment that the first unit is not, or they have different multipliers/premiums/adjustments). In such embodiments, the UI control may accordingly reference determined values corresponding to what either side represents (e.g., with details on the multiplier/premium/adjustment).

The UI control may be included in an application that utilizes data concerning a user, entity or item by obtaining data from a system such as an enterprise system that manages such data and can use an engine to determine a corresponding range of values and a set of limits. This can be applied to both individual UI controls and combined UI controls that include both first and secondary UI components, e.g., as discussed above.

In one aspect, there is provided a computer-implemented method. The method includes presenting a user interface control, the user interface control extending between a first display position and a second display position and defining a track, the extent of the track corresponding to a range of values, the user interface control having a manipulable portion and a non-manipulable portion, wherein a selector is movable along the track within the manipulable portion to select a value within an allowable subrange of the range of values, the allowable subrange based on a limit defining an extent of the allowable subrange and the non-manipulable portion corresponding to a portion of the range of values beyond the limit.

In certain example embodiments, the method can further include presenting the non-manipulable portion continuous with the manipulable portion and separated by a visual element identifying the limit.

In certain example embodiments, the manipulable portion of the user interface control can include a minimum proportion of the track dedicated to the allowable subrange of the range of values.

In certain example embodiments, values outside the allowable subrange of values can be represented by the non-manipulable portion using a different scale than the allowable subrange of the range of values in the manipulable portion.

In certain example embodiments, the different scale can correspond to a discontinuity in functions used to define an incrementation of values on either side of the limit.

In certain example embodiments, the minimum proportion can be determined according to a maximum proportion allocated to the non-manipulable portion.

In certain example embodiments, the minimum proportion can be determined according to a type of value being represented.

In certain example embodiments, the limit can be a lower limit or the limit can be an upper limit.

In certain example embodiments, the method can include determining at least one additional limit, wherein the manipulable portion is displayed between a pair of limits.

In certain example embodiments, a first limit of the pair of limits includes a lower limit and a second limit of the pair of limits include an upper limit.

In certain example embodiments, the user interface control can include a slider element to permit the selection of values in the allowable range by moving the slider element along the track.

In certain example embodiments, the method can further include detecting a selection within the non-manipulable portion; displaying an alert associated with the selection;

and enabling values outside the limit to be selected in response to detecting an acknowledgement of the alert.

In certain example embodiments, the non-manipulable portion can be resized to facilitate selection of the values outside the limit.

In certain example embodiments, the method can further include presenting a dependent user interface control, the dependent user interface control enabling selection of values at corresponding locations along a second track defined by the dependent user interface control; and adjusting at least one value associated with the dependent user interface control according to a selection made in the user interface control.

In certain example embodiments, the dependent user interface control can extend between a first display position and a second display position and defines the second track, the extent of the second track corresponding to a second range of values, the dependent user interface control having a manipulable portion and a non-manipulable portion, wherein a second selector is movable along the second track within the manipulable portion to select a value within an allowable subrange of the second range of values, the allowable subrange based on a limit defining an extent of the allowable subrange and the non-manipulable portion corresponding to a portion of the second range of values beyond the limit.

In certain example embodiments, the at least one value associated with the dependent user interface control can include an upper limit dictated by the selection made in the user interface control.

In certain example embodiments, the range of values can correspond to compensation over a period of time, and selections made within the manipulable portion adjust an allocation of the compensation between a plurality of types of compensation.

In certain example embodiments, the allocations can be presented and updated as selections are made within the manipulable portion.

In certain example embodiments, the method can further include displaying a dependent user interface control with a second range of values dictated by a selection made in the user interface control, the dependent user interface control enabling a sub-allocation of a type of compensation to be adjusted; and adjusting the sub-allocation according to a selection made in the dependent user interface control.

In certain example embodiments, the range of values can correspond to a metered value. The metered value can include any one of a temperature, a pressure, an audio control, a speed, a physical dimension, an airflow, a unit of mass, or a unit of energy.

In another aspect, there is provided a system. The system includes a processor, a display coupled to the processor, at least one input device coupled to the processor, and at least one memory. The at least one memory includes processor executable instructions that, when executed by the at least one processor, causes the system to: present a user interface control, the user interface control extending between a first display position and a second display position and defining a track, the extent of the track corresponding to a range of values, the user interface control having a manipulable portion and a non-manipulable portion, wherein a selector is movable along the track within the manipulable portion to select a value within an allowable subrange of the range of values, the allowable subrange based on a limit defining an extent of the allowable subrange and the non-manipulable portion corresponding to a portion of the range of values beyond the limit.

In another aspect, there is provided a computer-readable medium comprising processor executable instructions that, when executed by a processor, cause the processor to present a user interface control, the user interface control extending between a first display position and a second display position and defining a track, the extent of the track corresponding to a range of values, the user interface control having a manipulable portion and a non-manipulable portion, wherein a selector is movable along the track within the manipulable portion to select a value within an allowable subrange of the range of values, the allowable subrange based on a limit defining an extent of the allowable subrange and the non-manipulable portion corresponding to a portion of the range of values beyond the limit.

Turning now to the figures, FIG. 1a illustrates an example of a computing environment 10 in which an application 12 is provided by or with one or more computing devices. Such computing devices can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality device, an augmented reality device, etc. The application 12 includes a UI 20 to enable a user 18 to interact with the application 12 and the computing environment 10 more generally, e.g., via the application 12. The application 12 can take the form of a desktop-type application, a mobile-type application (also referred to as an "app"), an embedded application in customized computing systems, or an instance or page contained and provided within a web/Internet browser, to name a few. The UI 20 while shown as part of the application 12 can instead be provided by a separate computing device from the computing device used to run the application 12. As such, the configuration shown in FIG. 1a is illustrative and other computing device configurations are possible as shown by way of example in FIG. 1b.

For example, the computing environment 10 shown in FIG. 1a can represent a single device such as a portable electronic device or the integration/cooperation of multiple electronic devices such as a client device and server device or a client device and a remote or offsite storage or processing entity or service. That is, the computing environment 10 can be implemented using any one or more electronic devices including standalone devices and those connected to offsite storage and processing operations (e.g., via cloud-based computing storage and processing facilities). For example, the UI 20 may be provided by an electronic device while application data 24 used by such a UI 20 can, at least in part, be stored and accessed from an external memory or application, including a cloud-based service or application 12.

The application 12 and UI 20 are coupled to a display 14 to render and present/display UI elements, UI components, and UI controls 21 utilized by the UI 20 and application 12, on the display 14. While examples referred to herein may refer to a single display 14 for ease of illustration, the principles discussed herein can also be applied to multiple displays 14, e.g., to view portions of the UI 20 (and/or other UIs provided by the application 12) on separate side-by-side screens. That is, any reference to a display 14 can include any one or more displays 14 or screens providing similar visual functions. The application 12 receives one or more inputs from one or more input devices 16, which can include or incorporate inputs made via the display 14 as illustrated in FIG. 1a as well as any other available input to the computing environment 10, such as haptic or touch gestures, voice commands, eye tracking, biometrics, keyboard or button presses, etc. Such inputs may be applied by a user 18 interacting with the computing environment 10, e.g., by operating an electronic device having the display 14 and at least an interface to one or more input devices 16.

The application 12 or a computing device within the computing environment 10 can include or have access to the application data 24. The application data 24 can include data used by the application 12 to perform operations provided by the features associated with the application 12, including data used in rendering the UI 20 and/or providing a UI control 21.

The UI 20 can include one or more components to enable the user 18 to interact with the application 12 and/or an underlying system in the computing environment 10 via the UI 20. One example of a UI component is a UI control 21, which permits a user to interact with the UI 20 to make a selection that can provide an input to the application 12 or system within the computing environment 10, via the UI control 21.

Figure 1B:
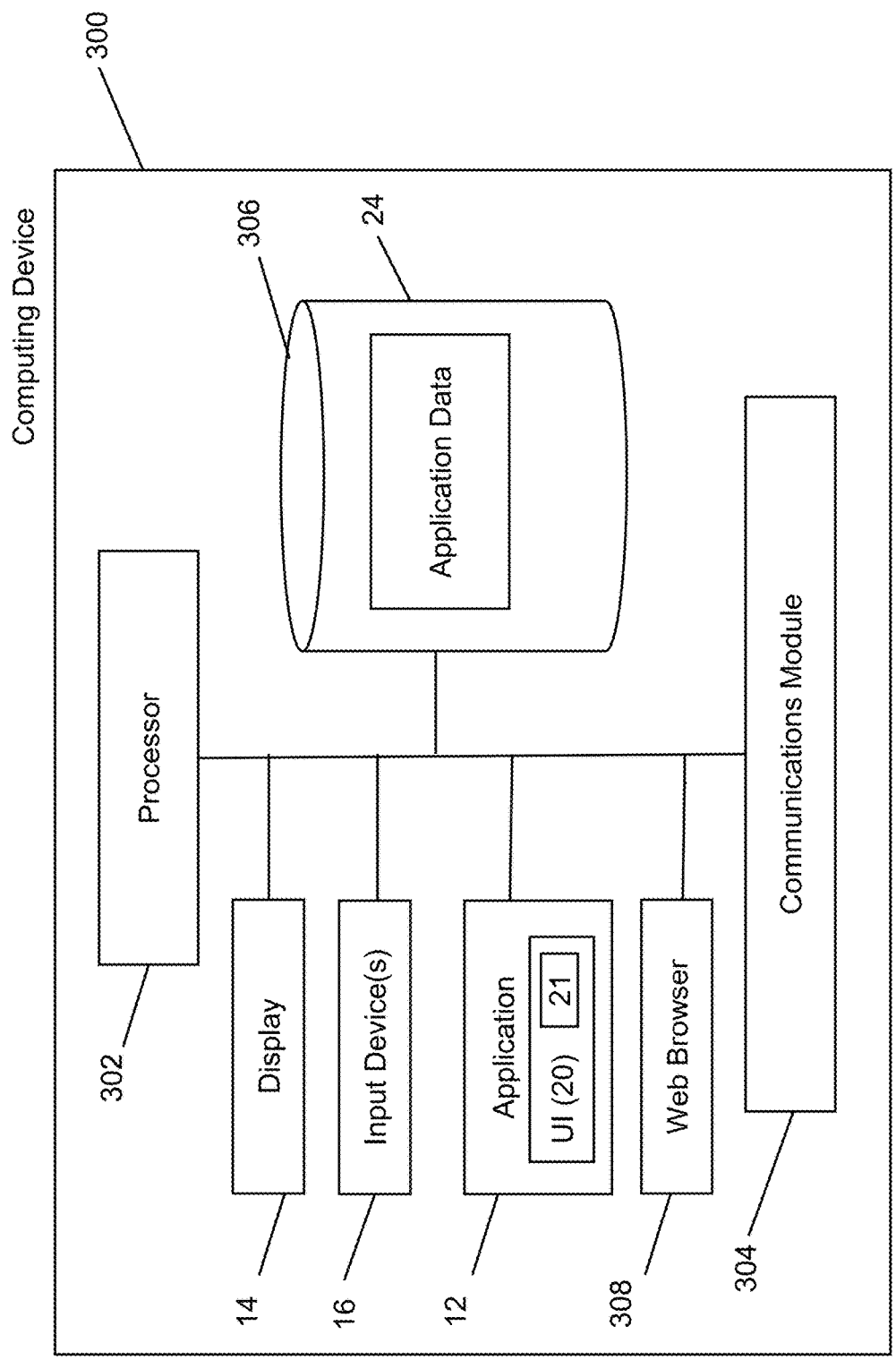
FIG. 1b is an example of a computing device having an application and UI with UI controls.

FIG. 1b shows an example of a computing device 300 implementing an example embodiment of the computing environment 10 shown in FIG. 1a. In this example, the computing device 300 includes one or more processors 302 (e.g., a microprocessor, microcontroller, embedded processor, digital signal processor (DSP), central processing unit (CPU), media processor, graphics processing unit (GPU) or other hardware-based processing units) and one or more communications modules 302 (e.g., a wired or wireless transceiver device connectable to a network via a communication connection). Examples of such communication connections can include wired connections such as twisted pair, coaxial, Ethernet, fiber optic, etc. and/or wireless connections such as LAN, WAN, PAN and/or via short-range communications protocols such as Bluetooth, WiFi, NFC, IR, etc. The computing device 300 also includes a data store 306, the application 12, and/or a web browser 308. The data store 306 may represent a database or library or other computer-readable medium configured to store data and permit retrieval of such data. The data store 306 may be read-only or may permit modifications to the data. The data store 306 may also store both read-only and write accessible data in the same memory allocation.

While not delineated in FIG. 1b, the computing device 300 includes at least one memory or memory device that can include a tangible and non-transitory computer-readable medium having stored therein computer programs, sets of instructions, code, or data to be executed by processor(s) 302. The processor(s) 302 and communication module(s) 304 are connected to each other via a data bus or other communication backbone to enable components of the computing device 300 to operate together as described herein. FIG. 1b illustrates examples of modules and applications stored in memory on the computing device 300 and operated by the processor(s) 302. It can be appreciated that any of the modules and applications shown in FIG. 1b may be hosted externally and be available to the computing device 300, e.g., via a communications module 304. The data store 306 in this example stores, among other things, the application data 24 that can be accessed and utilized by the application 12. The computing device 300 also includes the display 14 and one or more input device(s) 16 that can be utilized as described above. The application 12 includes a UI 20 and one or more controls 21, which can also be utilized as described above in connection with FIG. 1a. The web browser 308 is shown by way of example to illustrate that the application 12, or an application that is similarly configured, may be accessed by a user of the computing device 300 via a network (not shown) accessible via the communications module 304. That is, an application 12 and UI 20 may also be accessed and utilized by the computing device 300 from a server or other remote source and need not be a locally running application 12.

Figure 2:
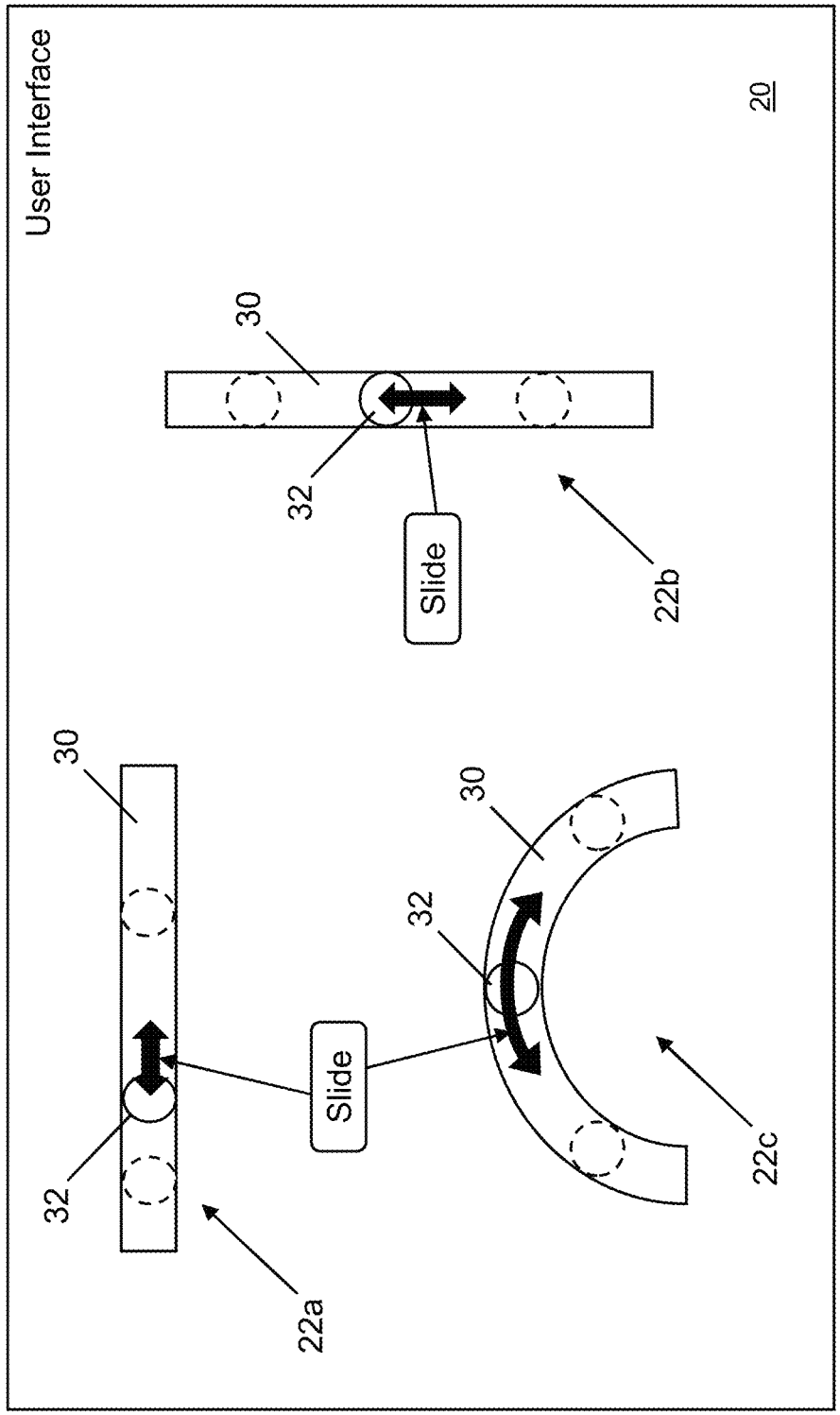
FIG. 2 shows an example of a UI having UI controls.

An example of a UI control 21 is a slider UI control 22, examples of which are illustrated in FIG. 2. As noted above, while certain examples provided herein depict a slider UI control 22, the principles discussed herein can be applied to any UI control 21 that enables a selection along at least a portion of a track 30 extending between display positions in the UI control 21.

The slider UI control 22 can be presented so as to extend between first and second display positions to occupy a particular amount of screen space. The slider UI control 22 includes a track 30, which defines the controllable portion of the slider UI control 22. The track 30 can have underlying values in the numerical space that are selectable or some of those values may be selectable while others are not selectable. That is, the track 30 can be presented with one or more portions thereof that are visually depicted but are not selectable. Alternatively, the track 30 may correspond to only the selectable portion of the UI control that visually represents the underlying range of selectable values in the numerical space. The slider UI control 22 can also include a selector 32, which is movable or selectable along the track 30. The selector 32 is illustrated in FIG. 2 as being movable or selectable within a manipulable portion of the track 30 but may, in some embodiments, permit a selection within a non-manipulable portion of the track 30 (or an area of the UI control 22 that is outside of the track 30 in other embodiments). It can be appreciated that in the examples shown in FIG. 2, the manipulable portion of the UI control 22 corresponds to the entire track 30. FIG. 2 illustrates that the track 30 can be presented in different orientations. For example, slider UI control 22a is presented in a substantially horizontal orientation relative to the presentation of the UI 20. In another example, slider UI control 22b is presented in a substantially vertical orientation relative to the presentation of the UI 20 and relative to slider UI control 22a. Slider UI control 22c is instead presented as an arc or dial such that the track 30 is not necessarily linear (or completely linear) or otherwise follows a non-linear path. The selector 32 provided in slider UI control 22c can be configured to follow the arc defined by the track 30, akin to a dial or gauge. More broadly, the slider UI control 22 may be presented using various shapes and contours with at least a portion of the UI control 22 defining a track 30 that constrains movement of a selector along the slider UI control 22. The slider UI control 22 may also be presented with the extents of the track 30 defining a range of positions that can be selected and may permit the selector to be moved along the track 30 to the range of positions to select a corresponding underlying value from the range of values. While not shown in FIG. 2, but discussed below, the slider UI control 22 may also include a non-manipulable portion with underlying values that are outside of one or more limits, and the non-manipulable portion may form part of the track 30. It can be appreciated that the slider UI controls 22a, 22b, 22c are not necessarily shown to scale in FIG. 2 and may be presented with other UI elements, UI components and/or UI controls which are omitted from FIG. 2 for ease of illustration. That is, FIG. 2 is illustrative of particular orientations and configurations for a slider UI control 22, which may be incorporated into the UI 20 and other features provided by the UI (not shown).

FIG. 3 shows an example embodiment of a slider UI control 22 in isolation. In the numerical space, there exists a minimum value 42 and a maximum value 46 that define a range of values 38. In this example embodiment, the minimum and maximum values 42, 46 are outside of a sub-range of values defined by a lower limit 40 within the range of values 38 and an upper limit 44 within the range of values 38. In FIG. 3, the visual control space of the slider UI control 22 extends from a lowest extent that corresponds to the underlying lower limit 42 in the numerical space to a highest extent that corresponds to the underlying upper limit 44 in the numerical space. The displayed portion of the slider UI control 22 corresponds to a manipulable portion 34 of the track 30, which in this example occupies the entire extent of the visual control space of the slider UI control 22. That is, the entire manipulable portion 34 is allocated to the sub-range of values between the lower and upper limits 42, 44 instead of the entire range of values 38 extending from the minimum value 42 to the maximum value 46. That is, the values outside of the allowable sub-range of values in the numerical space effectively correspond to non-manipulable portions 36a, 36b are not being displayed, which in this example may be analogized to being hidden or otherwise not being available or seen in the visual control space (as illustrated using short, dashed lines) while the underlying values still exist by being part of the range of values 38. The minimum displayed point and maximum displayed point in the slider UI control 22 (defining the manipulable portion 34) are thus based on the limits 40, 44 rather than the actual, expected or theoretical endpoints (i.e., minimum and maximum values 42, 46) of the range of values 38. For example, if a volume control is limited to between a minimum 20% output (e.g., volume level 2/10) and a maximum 80% output (e.g., volume level 8/10), the values that can be selected from the manipulable portion 34 of the slider UI control 22 as shown in FIG. 3 would include those values from 20% to 80% (e.g., volume levels 2 through 8). In this way, the user 18 can be restricted to selecting only the permitted values in the manipulable portion 34, since the non-manipulable portions 36a, 36b are not displayed to the user 18, as if they are hidden from the user and thus the values in the numerical space that are outside of the limits 42, 46 are also not available to the user for selection in this example embodiment. While both upper and lower limits 40, 44 are shown in this example, it can be appreciated that the example embodiment in FIG. 3 can be adapted to UI controls 22 that include only a lower limit 40 or only an upper limit 44. A selected value (V) 48 corresponding to the selected position along the track 30 may also be displayed as shown in FIG. 3.

In scenarios or implementations where the entire range of values 38, including the actual, expected, or theoretical minimum value 42 and actual, expected, or theoretical maximum value 46 are to be presented and displayed in the slider UI control 22 (whether selectable or not), the non-manipulable portions 36a, 36b can be presented in the UI slider control 22 along with the manipulable portion 34 as shown in FIG. 4. In this example, the lowest extent of the track 30 corresponds to the minimum value 42 in the range of values 38 and the highest extent of the track 30 corresponds to the maximum value 46 in the range of values 38. Moreover, the lower limit 40 within the range of values 38 is placed along the track 30 between the minimum value 42 (and thus lowest extent of the track 30) and the upper limit 44 (and thus the highest extent of the manipulable portion 34). Likewise, the upper limit 44 is placed along the track 30 between the lower limit 40 (and thus the lowest extent of the manipulable portion 34) and the maximum value 46 (and thus the highest extent of the track 30). The non-manipulable portions 36a, 36b are part of the track 30 and are presented in the slider UI control 22 such that they are visually distinguishable from or otherwise identifiable relative to the manipulable portion 34. The non-manipulable portions 36a, 36b of the track 30 in this example are displayed contiguously with the manipulable portion 34 along and defining the lowest and highest extents of the track 30. FIG. 4 also illustrates a visual identifier referred to herein as a "guardrail" 50 at the lower limit 40. The guardrail 50 may also be referred to as a limit indicator, a bumper, a railing, a wall, among other things. The non-manipulable portions 36a, 36b may, additionally or alternatively be shown in a shaded form to distinguish them from the manipulable portion 34. Other visually distinguishable attributes or elements can be used to represent the non-manipulable portions 36a, 36b, for example, blurring or fading, distinct coloring (e.g., a red coloring outside of limits), cross-hatching, gradients, etc. In the example shown in FIG. 4, the non-manipulable portions 36a, 36b are shaded relative to the manipulable portion 34 with the lower guardrail 50 providing an additional visual cue to the user 18 as to the corresponding limit 40, 44 placed within the range of values 38. It can be appreciated that as shown in other examples herein, an upper guardrail 52 (see also FIGS. 5 and 6) can be displayed along with or instead of the shading applied to the non-manipulable portions 36a, 36b. Also, similar to what is shown in FIG. 3, the selected value (V) 48 can be displayed with the slider UI control 22.

When compared to the slider UI control 22 shown in FIG. 3, the slider UI control 22 shown in FIG. 4 consumes a similar amount of displayed screen space. In the example embodiment shown in FIG. 3, the entire displayed screen space is dedicated to the manipulable portion 34 while not displaying the non-manipulable portions 36a, 36b akin to hiding the corresponding underlying values in the range of values 38 that are outside of the limits 40, 44. In the example embodiment shown in FIG. 4, both the manipulable portion 34 and the non-manipulable portions 36a, 36b are displayed together within the total screen space allocated to the slider UI control 22 and in this example the extent of the track 30. As such, a tradeoff may be encountered wherein for a slider UI control 22 that utilizes the embodiment shown in FIG. 3, the manipulable portion 34 is maximized within the available screen space but omits an expected (or at least theoretical) portion of the range of values 38 (in the underlying numerical space) from what is presented to the user 18. However, according to the example embodiment shown in FIG. 4, a different tradeoff may be encountered, wherein the entire range of values 38 is displayed, but with a relatively smaller manipulable portion 34 due to the limits 40, 44 that are placed within the range of values 38. Depending on the size of the non-manipulable portions 36a, 36b, this other tradeoff may be acceptable if only a small proportion of the track 30 is dedicated to the non-manipulable portions 36a, 36b. If the relative size of the non-manipulable portion(s) 36 is higher and less acceptable, the embodiment shown in FIG. 3 can be used or a non-proportionate placement of limits 40, 44 within the slider UI control 22 (to effect a non-proportionate allocation of manipulable and non-manipulable portions 34, 36) can be employed to increase and maximize the manipulable portion 34 presented by the slider UI control 22 as shown in FIG. 5.

Figure 5:
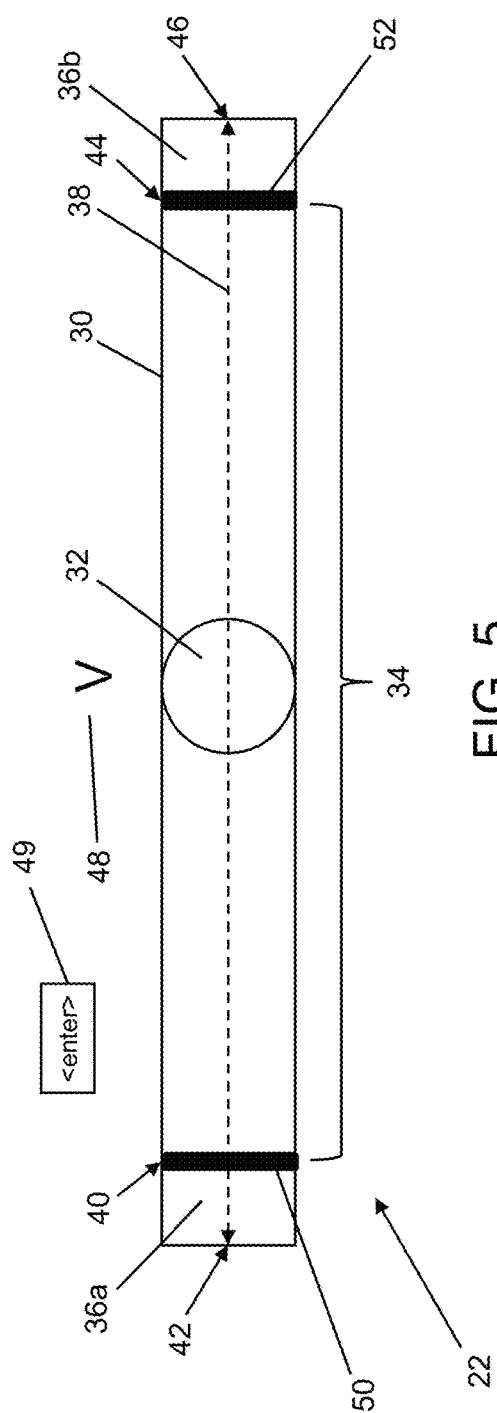
FIG. 5 shows an example of a slider UI control having non-manipulable portions outside of upper and lower limits within a range of values, and including upper and lower guardrails visually identifying the upper and lower limits.

Referring now to FIG. 5, a slider UI control 22 is shown that uses a non-proportionate placement of the lower limit 40, upper limit 44 and corresponding guardrails 50, 52 to effect a non-proportionate allocation of manipulable and non-manipulable portions 24, 26. In this example, it can be observed that the guardrails 50, 52 are biased towards the minimum and maximum values 42, 46 in the range of values 38, such that the proportion of the track 30 dedicated to the non-manipulable portions 36a, 36b is less than what would be provided in a proportionate allocation between the manipulable portion 34 and the non-manipulable portions 36a, 36b. The selector 32 can be used to select a value within the sub-range of values represented by selectable positions along the track 30 in the slider UI control 22 between the lower limit 40 and the upper limit 44 and defined as the manipulable portion 34 similar to the example embodiments shown in FIGS. 3 and 4, but with a larger proportion of the track 30 being allocated to the values that are selectable. This allows a number of selectable positions in the track 30 to be spaced further apart, or additional selectable positions (and underlying represented values) to be included within the same amount of screen space. The larger proportion of the track 30 allocated to the manipulable portion 34 can permit additional granularity to be provided for the selectable values in the manipulable portion 34. For example, by dedicating additional screen space to the manipulable portion 34, a finer-incrementation can be used, such as allowing fractional whole numbers that would otherwise be difficult to select with precision if presented using a relatively smaller manipulable portion 34. This can be particularly advantageous when the selectable values correspond to a currency, wage, or other monetary amount, and can affect how values are rounded for presentation to the user 18. FIG. 5 also illustrates that the selected value (V) 48 can be displayed. A text entry box 49 can also be provided, as discussed herein, to allow a user to enter the desired value, which causes the selector 32 to snap to the entered value, if within the permitted range of values (e.g., if within the values represented in the manipulable portion 34).

Figure 6:
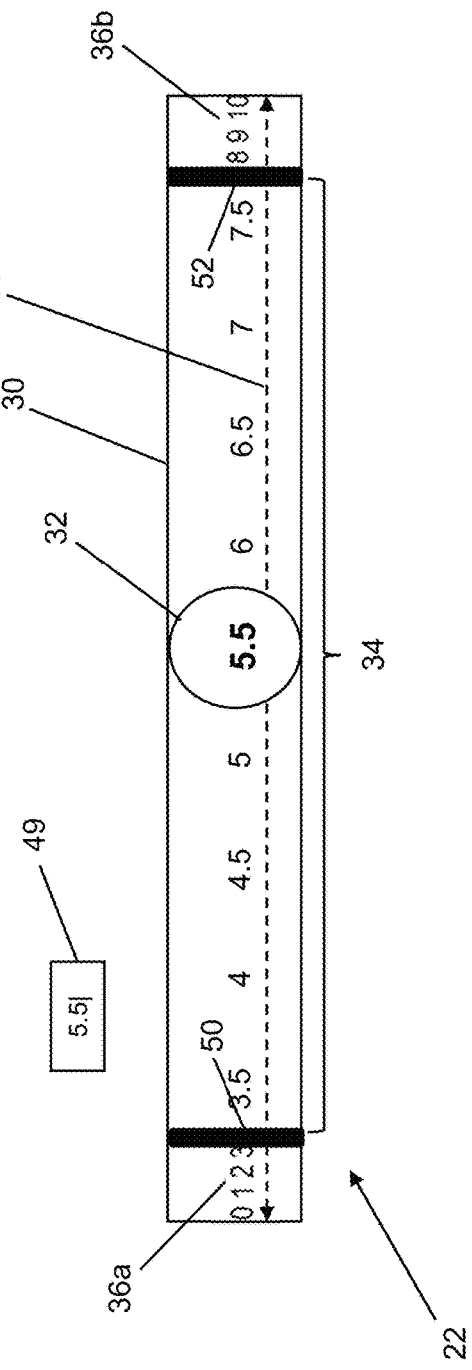
FIG. 6 shows the slider UI control of FIG. 5 with an overlay of values utilizing different scaling in the manipulable and non-manipulable portions of the slider UI control.

FIG. 6 illustrates the slider UI control 22 of FIG. 5 with an overlay of values to depict a non-proportionate scaling that can be applied to the track 30 (i.e., to place the upper and lower limits 40, 44 and corresponding guardrails 50, 52 in a non-proportionate manner). In this example, a set of values from zero (0) to 10 are shown, with an incrementation that includes more closely spaced intervals in the manipulable portion 34 (e.g., the fractional intervals of one-half or 0.5 as depicted between the positions of the track 30 representing the values 3 and 8). The manipulable portion 34 thereby occupies a higher proportion of the track 30 as compared with, for example, the slider UI control 22 shown in FIG. 4 and described above. This illustrates one effect of the non-proportionate scaling, namely that values in the non-manipulable portions 36a, 36b may be provided with proportionately less space than the values in the manipulable portion 34. The effect may be achieved by, e.g., changing the incrementation by either allowing a larger spacing between values and/or allowing more values to be included in the manipulable portion 34 (e.g., by permitting fractional values as shown in FIG. 6). That is, the non-manipulable portion(s) 36a, 36b may be represent underlying values in the numerical space beyond the corresponding limit(s) 40, 44 with a different scale, spacing or other proportion than what is used for representing the underlying values in the numerical space that are selectable in the visual control space via the manipulable portion 34. In FIG. 6, the fractional value "5.5" corresponds to the position of the selector 32, which in this example may have been input via the text entry box 49, which illustrates the entry of the value "5.5". As noted above, while certain example embodiments described herein identify a range and/or subrange of values that are, or contain, linear sequences (e.g., 1, 2, 3, 4), the (sub)range of values may be, or contain, non-linear sequences (e.g., geometric, exponential, logarithmic, sequences effecting an ease-in or ease-out or easy-ease, etc.).

For example, a maximum number of pixels or proportion of pixels dedicated to the non-manipulable portion(s) 36 can be set or provided as an input according to which application, which data set or which UI control 21 is being presented. Other formulae can be used to set the proportion of the non-manipulable portion(s) 36, such as threshold percentage or a remainder of space after dedicating a threshold amount of space to the manipulable portion 34.

As shown in FIGS. 7 and 8, the non-proportionate scaling of values in the non-manipulable portion 36 can be applied to slider UI controls 22 that include only an upper limit 44 (e.g., as shown in FIG. 7) as well as to slider UI controls 22 that include only a lower limit 40 (e.g., as shown in FIG. 8). That is, the principles described herein concerning the non-proportionate scaling can apply to any one or more non-manipulable portions 36 to expand or increase the proportionate amount of the track 30 that is allocated to the manipulable portion 34. FIG. 7 illustrates an example wherein the upper limit 44 is demarcated by a shaded upper non-manipulable portion 36b while FIG. 8 illustrates an example wherein the lower limit 40 is represented by a shaded lower non-manipulable portion 36a as well as a lower guardrail 50 to illustrate that various implementations are possible for presenting a slider UI control 22 that includes at least one limit 40, 44.

In the example shown in FIG. 7, the lowest extent of the selectable portion of the track 30 corresponds to the minimum value 42 in the range of values 38 and the highest extent of the selectable portion of the track 30 corresponds to the upper limit 44 placed in the range of values 38. Moreover, the upper limit 44 is placed along the track 30 between the minimum value 42 in the range of values 38 and the maximum value 46, which corresponds to the highest extent of the track 30. The placement of the upper limit 44 defines where the non-manipulable portion 36b begins. Since only an upper limit 44 has been placed along the track 30, the manipulable portion 34 of the track 30 extends between the minimum value 42 in the range of values 38 and the upper limit 44. It can be appreciated that the non-manipulable portion 36b can be considered a portion of the track 30 or can be considered a portion of the slider UI control 22 that is outside of the track 30.

In the example shown in FIG. 8, the lowest extent of the track 30 corresponds to the minimum value 42 in the range of values 38 and the lowest manipulable extent of the track 30 corresponds to the lower limit 40 placed within the range of values 38. The highest extent of the track 30 corresponds to the maximum value 46 in the range of values 38 since no upper limit 44 is included in this example. The lower limit 40 is placed along the track 30 between the minimum value 42 in the range of values 38 and the maximum value 46 (and thus the highest extent of the track 30) to separate the non-manipulable portion 36a from the manipulable portion 34/to delineate between the non-manipulable portion 36a and the manipulable portion 34. Since only a lower limit 40 has been placed along the track 30, the manipulable portion 34 of the track 30 extends between the lower limit 40 and the maximum value 46 in the range of values 38. It can be appreciated that the non-manipulable portion 36a can be considered a portion of the track 30 or can be considered a portion of the slider UI control 22 that is outside of the track 30.

Referring now to FIG. 9, a slider UI control 22 is shown in which a single non-manipulable portion 36 is presented within a central region of the track 30, such that the track 30 includes a first manipulable portion 34a that corresponds to values in the range of values 38 below a sub-range of values associated with the non-manipulable portion 36 and a second manipulable portion 34b that corresponds to values above the sub-range of values associated with the non-manipulable portion 36. As before, some of the non-manipulable portion 36, the first manipulable portion 36a, and the second manipulable portion 36b may have different scaling (e.g. in accordance with the non-proportionate scaling principles described above).

FIG. 10 provides another example embodiment in which a pair of non-manipulable portions 36a, 36b are interspersed along the track 30 to create three manipulable portions 34a, 34b, 34c to illustrate a non-proportionate scaling that can be applied to multiple areas or zones within the track 30. A first pair of limits 50a, 52a and a second pair of limits 50b, 52b are also shown to represent boundaries around the non-manipulable portions 36a, 36b in this example. FIG. 10 thus illustrates that the slider UI control 22 can include multiple areas, zones or other regions within the same track 30 or can be presented as a composite of multiple slider UI controls 22, e.g., two slider UI controls 22 where the upper manipulable portion 34b overlaps or is contiguous with the lower manipulable portion 34a of another slider UI control 22 to create the example embodiment shown in FIG. 10. As before, some of the non-manipulable portions 36 and manipulable portions 34 may have different scaling (e.g. in accordance with the non-proportionate scaling principles described above).

Figure 11A:
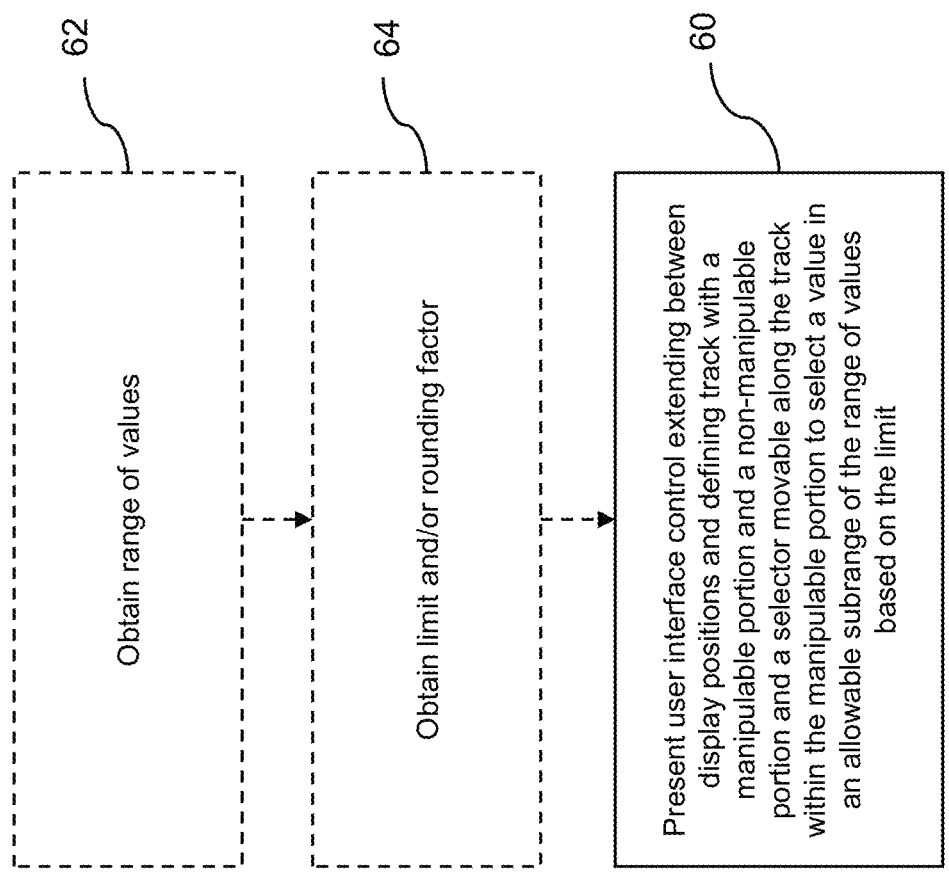
FIG. 11a is a flow chart illustrating example operations for presenting a UI control with a manipulable portion along a track.

FIG. 11a illustrates operations that can be performed in presenting a UI control 21 (e.g., a slider UI control 22) with a manipulable portion 34 along a track 30. At block 60, the UI 20 provided by an application 12 can have the processor 302 execute instructions to present a slider UI control 22 so as to extend between a first display position and a second display position to define a track 30. The extent of the track 30 can correspond to a range of values and the track 30 can include a manipulable portion 34 and a non-manipulable portion 36 (or multiple manipulable portions 36a, 36b, . . . ). The instructions executed by the processor 302 can also present a selector 32, which is movable along the track 30 within the manipulable portion 34 by detecting inputs to the one or more input devices 16, to select a value within an allowable subrange of the range of values, which can be defined by at least one limit (e.g., a lower limit 40, an upper limit 44, or both upper and lower limits 40, 44). The limit(s) 40, 44 define an extent of the allowable subrange within the range of values 38 to be allocated to the visual control space occupied by the manipulable portion 34, and the non-manipulable portion 36 corresponds to a portion of the range of values that are beyond the limit(s) 40, 44.

The range of values to be used by the processor 302 in presenting the UI control 21 in the UI 20, and the limit or limits 40, 44, may be fixed with a particular UI control 21, such as a slider UI control 22 used for a fixed function in the UI 20 of the application 12 or may be dynamically adapted to data or contextual information, such as application data 24. Optionally, as shown in dashed lines in FIG. 11a, if the range of values 38 is to be determined in order to present the UI control 21, the UI 20 or UI control 21 can obtain such range of values 38 at block 62. Similarly, if the limit(s) 40, 44 and/or a rounding factor (e.g., discussed above) are to be determined, the UI 20 or UI control 21 can have the processor 302 obtain such limit(s) 40, 44 and/or rounding factor at block 64. The range of values 38, limits 40, 44, and/or rounding factor thus obtained by the processor 302, may then be used by the processor 302 in presenting the UI control 21 via the display 14, as set forth in block 60.

Figure 11B:
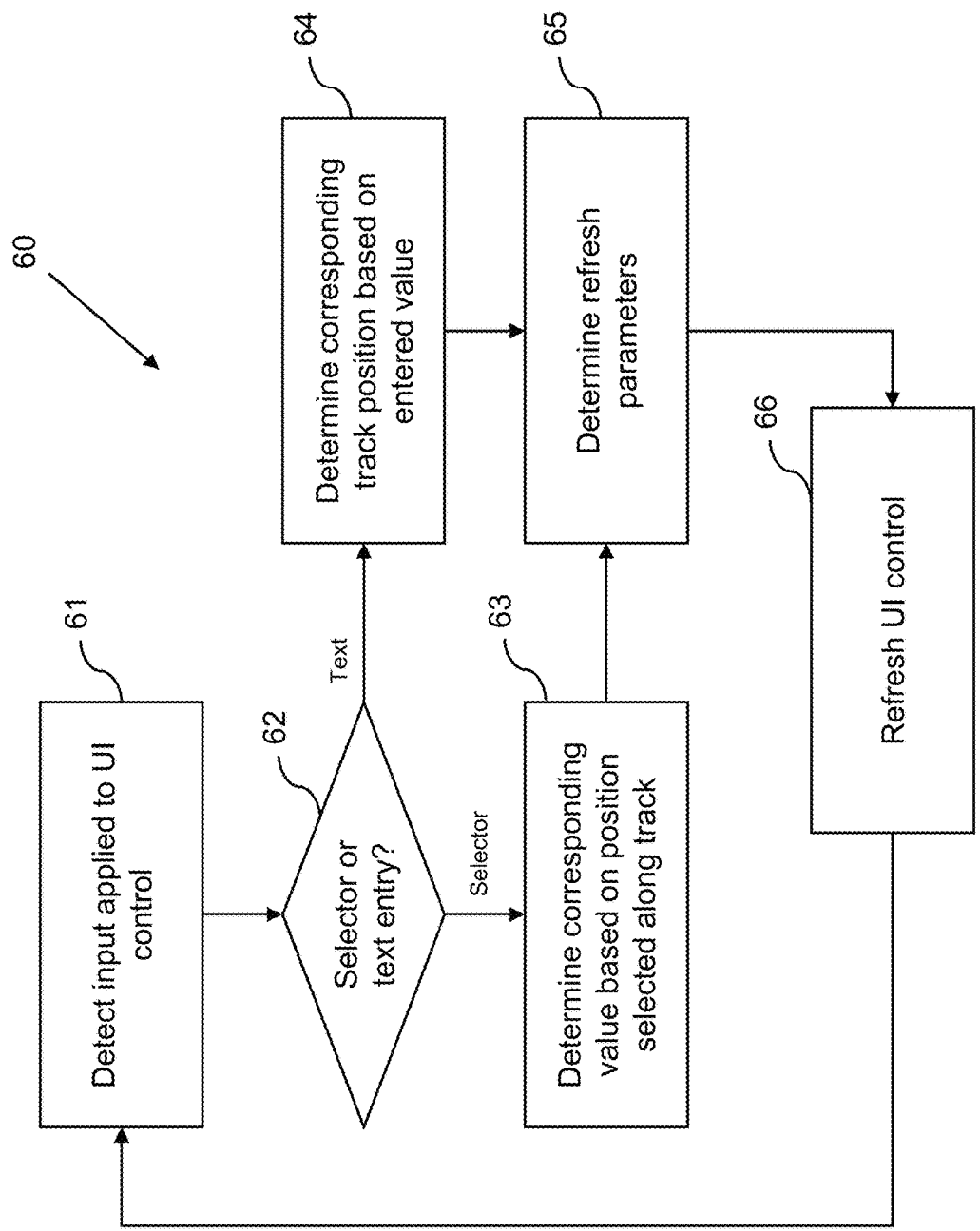
FIG. 11b is a flow chart illustrating example operations for refreshing a displayed UI control according to inputs applied to the UI control.

FIG. 11b illustrates an example embodiment of operations that may be performed in executing block 60 to receive inputs applied to a UI control 21 and to have the processor 302 refresh the UI control 21 on the display 14 according to a selection. It can be appreciated that the operations illustrated in FIG. 11b may be executed by the processor 302 in response to an input detected in an application 12 or web browser 308 having a UI 20 that utilizes such a UI control 21. At block 61, the processor 302 (being utilized by, e.g., an application 12 or web browser 308) detects an input applied to the UI 21 and determines at block 62 whether the input has been applied using the selector 32 or a text entry box 49 (e.g., as illustrated in FIGS. 5 and 6). If the selector 32 has been used to apply the input to the UI control 21, the processor 302 determines the corresponding value represented by the position at which the selector 32 has been placed along the track 30, at block 63. If the text entry box 49 has been used to apply the input to the UI control 21, the processor 302 determines the corresponding track position for the selector 32 based on the entered value, at block 64. It can be appreciated that the entered value may or may not coincide with an increment (e.g., rounding factor) that has been applied to the values represented in the manipulable portion 34 of the UI control 21. As such, at block 64, the processor 302 may apply a rounding or other adjustment in order to "snap" the selector 32 to the closest position. Alternatively, the processor 302 may be required to change the value (V) 48 to the adjusted value, and may also update the text entry box 49 to visually depict the adjustment.

For example, if an entered selection does not conform to allowable increments, the processor 302 may apply logic to automatically adapt the UI control 21 to fit within constraints dictated by the logic.

The determinations made in blocks 63 and 64 are then used in block 65 to determine a set of refresh parameters. The refresh parameters instruct the processor 302 as to how to refresh the UI control 21 at block 66, in order to update the UI 20 being displayed, also referred to herein as "repainting" the UI control 21. It can be appreciated that the UI control 21 can be partially or fully repainted in the UI 20 being displayed in the application 12 or via a web browser 308.

For example, a partial repainting may include repainting only the manipulable portion 34 of the track 30 to depict a new positioning of the selector 32 as well as updating the value 48 while reusing the other visual elements of the UI control 21 that are not being changed as a result of the input detected at block 61. It can be appreciated that in embodiments of the UI control 21 which do not include a text entry box 49, blocks 62 and 64 may be omitted.

Figure 12:
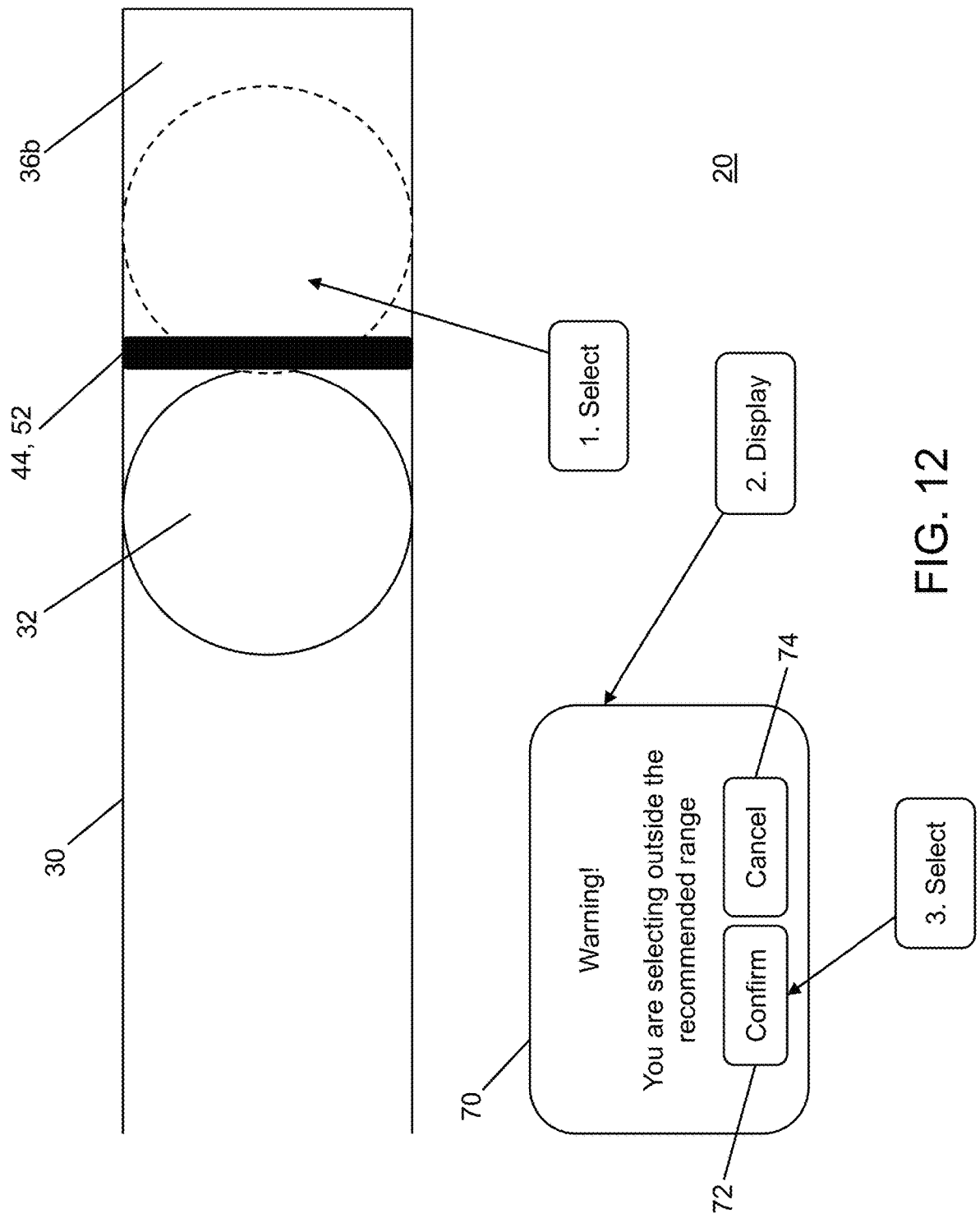
FIG. 12 shows a slider UI control that enables selection in a non-manipulable portion to trigger an alert to confirm a selection detected outside of an upper limit in a range of values.

In another example embodiment, shown in FIG. 12, the slider UI control 22 can be configured to detect attempts to select values within the non-manipulable portions 36a, 36b of the track 30 that are outside of the limits 40, 44 and present a warning or alert 70. FIG. 12 illustrates an enlarged view of an upper non-manipulable portion 36b and the corresponding upper limit 44 with an upper guardrail 52. As shown using a dashed-line version of the selector 32, a detected attempt to select a value beyond the limit 44 and guardrail 52 at step 1 can trigger the display of an alert 70 or other notification that provides a warning pertaining to the selection at step 1. In this example, the alert 70 provides the following message under a "Warning" header: "You are selecting outside the recommended range". A confirm option button 72 and a cancel option button 74 are provided with the alert 70 to enable the user 18 to confirm the desired out-of-range selection in the non-manipulable portion 36*b*, or to cancel the operation. For example, an audio slider control 22 could be limited to 90% of the total available volume and an alert 70 can be provided to warn the user of potential hearing damage if they proceed within confirming the out-of-range selection.

By selecting the confirm option button 72, the user 18 may be permitted to proceed with the selection attempted in step 1, e.g., by providing access to the non-manipulable portion 36*b* for that selection. The non-manipulable portion 36*b* can be rescaled at this stage (not shown) to have the same or similar scaling as the manipulable portion 34 or can maintain its current scaling. Additional operations may be executed, such as providing an enlarged or magnified view of the non-manipulable portion 36*b* for this out-of-range selection.

A warning mechanism may also be provided using optional guardrails 50, 52, which are visually presented but not necessarily enforced or are not considered mandatory. For example, a recommended range within the range of values 38 may be presented between a set of "soft" boundaries (e.g., soft guardrails). The soft boundaries may also be presented along with a second set of "hard" boundaries placed outside of the soft boundaries, which are mandatory limits placed within the range of values 38. That is, the range of values 38 may include multiple subranges defined by both soft and hard boundaries, with the subrange defined by the soft boundaries being within or inside of the subrange defined by the hard boundaries. In this way, a selection made within the portion of the track 30 that lies between the soft and hard boundaries can trigger a warning message, while a selection attempted outside of the hard boundaries can trigger an error that requires correction or prevents the selection from taking place at all.

In another example embodiment, the selector 32 can be constrained within the boundaries defined by the lower and upper limits 40, 44 (e.g., using guardrails 50, 52), while a text entry box 49 (provided to enable entry of a selectable value in the slider UI control 22) permits out-of-bounds values to be entered while presenting an error message. The error message may be in the form of a visual alert or notification, which may be cleared when the error is resolved. The error may be resolved by, e.g., entering a valid value into the text entry box 49 or moving the selector 32 to a value within the manipulable portion 34. For example, if an error is triggered by an input applied to the text entry box 49, the selector 32 may be held in place so as to not move while engaged with the text entry. If the error is resolved while still engaged, the selector 34 may then be moved to the correct position along the manipulable portion 34. If the user disengages with the text entry operation (e.g., deletes the entered value(s)), the selector 32 may be moved to the incorrect position (i.e., to within a non-manipulable portion 36) and both selector and text entry errors presented. The errors can be cleared by re-engaging with the text entry box 49 and entering a valid value or by moving the selector 32 to a valid position within the manipulable portion 34.

Figure 13:
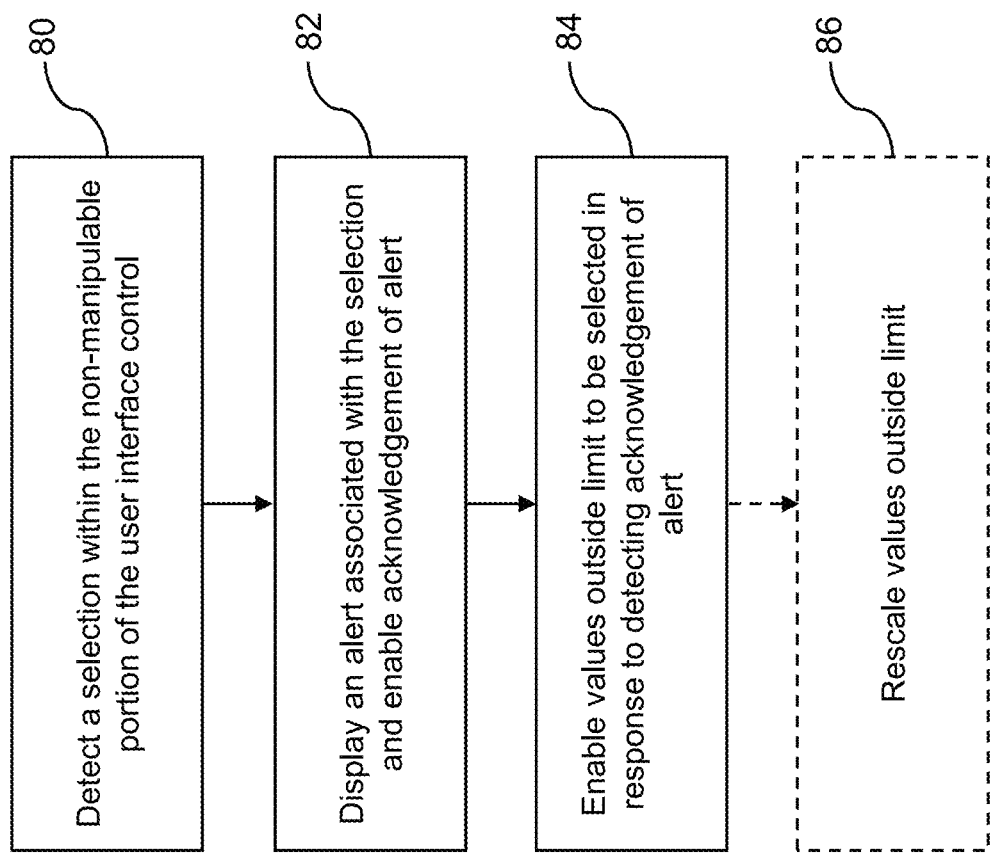
FIG. 13 is a flow chart illustrating example operations for detecting selection of a slider UI control outside of a limit in a range of values and presenting an alert in response to such selection.

Referring now to FIG. 13, example operations are shown for enabling selections in the non-manipulable portion 36 as illustrated in FIG. 12. At block 80, the UI 20 or UI control 21 detects selection of a value or area within the non-manipulable portion 36 of the UI control 21 and has the processor 302 display an alert 70 associated with the selection at block 82. The alert provided at block 82 can also enable the user 18 to acknowledge the alert 70, thus confirming that the wish to proceed with the out-of-range selection. At block 84 the UI control 21 can have the processor 302 execute instructions to enable values outside the limit 40, 44 to be selected in response to detecting acknowledgement of the alert 70. Optionally, at block 86, the processor 302 can rescale the values outside of the limit 40, 44, e.g., by enlarging or magnifying the non-manipulable portion 36 in the UI control 21, or by otherwise adapting the track 30 dynamically to provide an ability to provide a more granular selection than what would be experienced by rescaling the values outside the limit(s) 40, 44 as illustrated herein.

Figure 14:
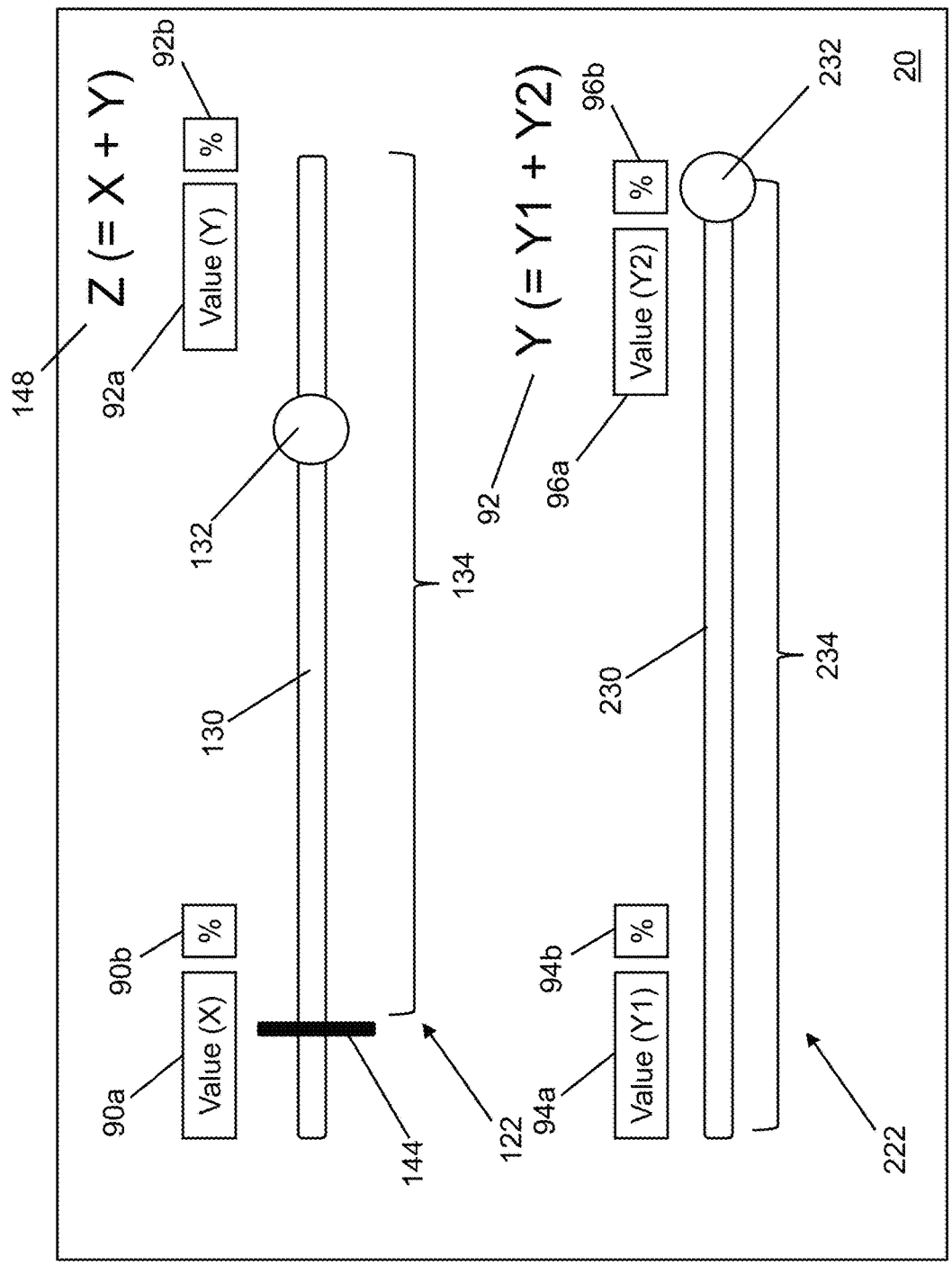
FIG. 14 shows an example of a UI presenting a multiple slider UI controls with one slider UI control that is at least in part affected by selections made in another slider UI control.

In another example embodiment, the slider UI control 22 illustrated herein can be adapted to provide multiple slider UI controls 122, 222 as shown in FIG. 14. In FIG. 14, a first slider UI control 122 is shown above a second slider UI control 222 that may or may not be dependent or linked to selections made in the first slider UI control 122. The second slider UI control 222 can be configured to rely on or otherwise be impacted by a selection from the first slider UI control 122. In this example, the first slider UI control 122 is configured to include a track 130 and selector 132 that can be dragged along the track 130 or placed along the track 130 by selecting a corresponding spot on the track 130 (e.g., for a coarse adjustment). The first slider UI control 122 also include a lower guardrail 144 to impose a lower limit on the range of values that can be selected using the track 130 to provide a manipulable portion 134. A total value (Z) 148 is displayed and for illustrative purposes indicates in parentheses that this value Z 148 is the sum total of two other values, namely a first value 90*a* (X) and a second value 92*a* (Y). The first value 90*a* includes a corresponding proportion 90*b* (%) of the value 148 (Z) and the second value 92*a* includes a corresponding proportion 92*b* (%) of the value 148 (Z). The first slider UI control 122 is used to change the proportion of Z that is allocated to either X or Y. In this way, as the selector 132 is moved to the right, the proportion 92*b* of the total value 148 is decreased while the proportion 90*b* of the total value 148 is commensurately increased with the corresponding values 92*a*, 90*a* updated respectively. The lower guardrail 144 can be used to place a lower limit on the value X such that the proportion of Z that is allocated to X cannot be lower than a certain lower limit.

The first slider UI control 22 in this example is thus configured to incorporate two units (i.e., X and Y) on the same track 130. That is, one side of the track 130 in this example is associated with a first unit (X) while the opposite side of the track 130 is associated with a second unit (Y). The first and second units (X+Y) together can amount to the value 148 (Z) that represents the sum of the first and second units. In this way, moving the selector 132 on the track 130 dynamically impacts the proportion of the sum allocated to each of the first and second units. In such a configuration, moving the selector 132 along the track 130 visually depicts such proportions based on the extent of the track 130 on either side of the selector 132. For example, in FIG. 14, the proportion allocated to X is higher than that allocated to Y as indicated by the selector 132 being located relatively closer to the end of the track 130 associated with Y.

In the example shown in FIG. 14, the second slider UI control 222 is seeded, defaulted to, or otherwise impacted by the selection made in the first slider UI control 122 by being associated with value Y 92. For example, value Y 92 may be a selectable proportion of Z 148 which sets an upper bound and thus the upper limit of the range of values depicted in the second slider UI control 222. In this case, Y can be allocated to a pair of options, Y1 illustrated by value 94*a* and proportion 94*b*, and Y2 illustrated by value 96*a* and proportion 96*b*. The track 230 in the second slider UI control 222 does not include either an upper limit or a lower limit and thus the entire track 230 is dedicated to the manipulable portion 234. It can be appreciated, however, that limits can be imposed on the second slider UI control 222 with or without non-linear or non-proportionate scaling applied as described herein depending on the nature of the underlying data associated with the selected values. For example, a pair of limits (not shown) can be applied to the second slider UI control 222 to impose that at least a minimum proportion of Y goes to either option Y1 or Y2. Such limits would in such a scenario correspond to first and second lower limits, each applied to a respective one of Y1 and Y2. Similar to the first slider UI control 122, the second slider UI control 222 in this example includes two units (Y1 and Y2) on the same slider.

As illustrated in FIG. 14, the slider UI controls 122, 222 can further include one or more text fields for the values X, Y, Y1, Y2 (or percentages used to define same), to allow users to manually enter values to make granular modifications to their selections, which can in turn adjust the slider element 132, 232 of the slider UI controls 122, 222. The visualized values 90*a*, 90*b*, 92*a*, 92*b*, 94*a*, 94*b*, 96*a*, 96*b* (that have been selected from the range of values using the slider UI control 122, 222) may provide a value in the range of values, a proportion or percentage of the upper end of the range of values, or both. For example, when providing a slider UI control 122, 222 to obtain a selection, the selection may be associated with a selected value such as a temperature or volume level, or a proportion (e.g., percentage) of a total value allocated to one option or another option. As discussed above, in some example embodiments, moving the slider in the slider UI control 122, 222 may increase or decrease the sum of the first and second units used for values X and Y (e.g., because the second unit is subject to some sort of multiplier or premium or adjustment that the first unit is not, or they have different multipliers/premiums/adjustments). In such embodiments, the UI control 122, 222 may accordingly reference determined values corresponding to what either side represents (e.g., with details on the multiplier/premium/adjustment).

Figure 15:
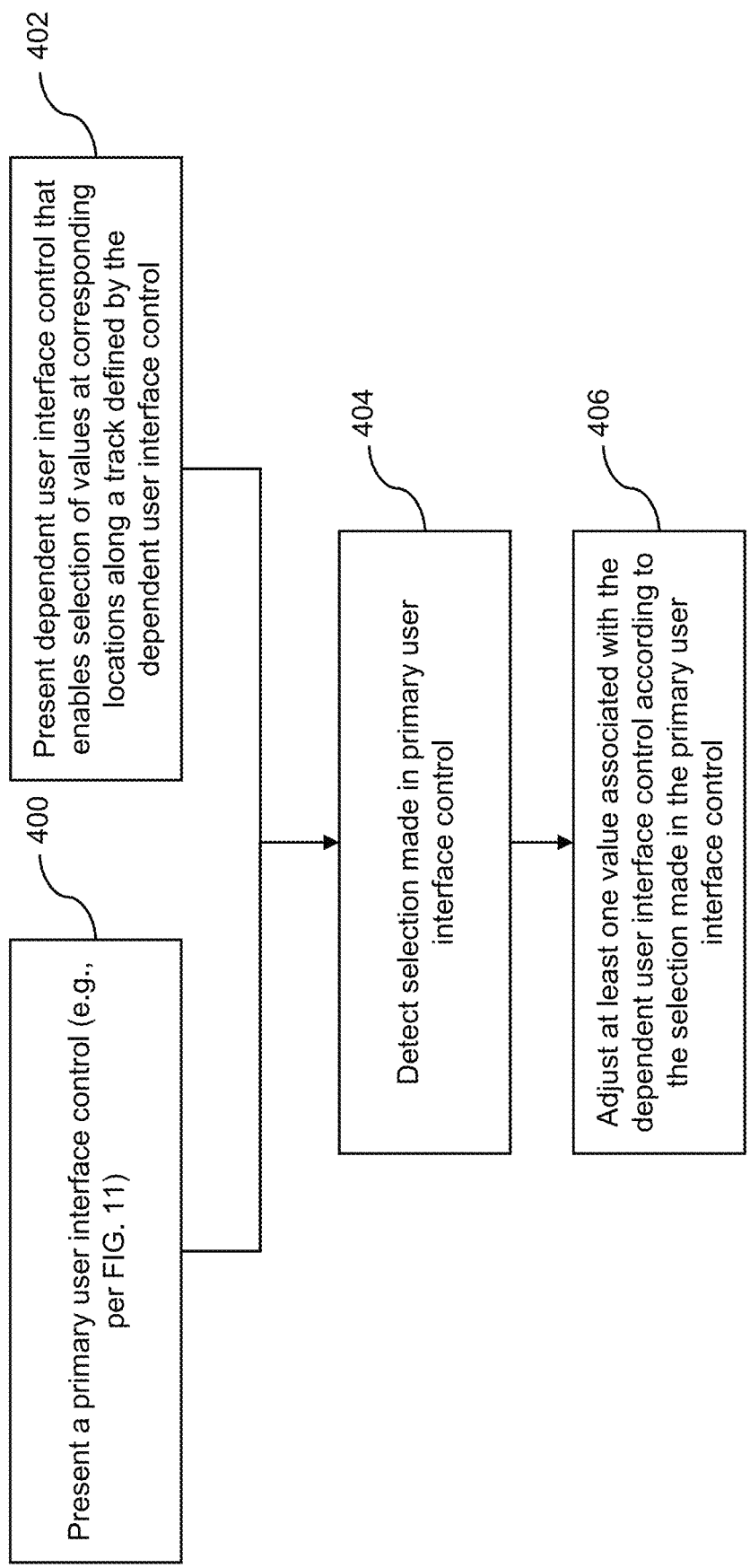
FIG. 15 is a flow chart illustrating example operations for detecting selections made in one UI control and adjusting values in another UI control.

FIG. 15 illustrates an example set of operations that can be executed in presenting a slider UI control 122, 222 such as that shown in FIG. 14 that couples or combines multiple slider UI controls 22 together with a dependent relationship. At block 400, a first UI control 122 can be presented, e.g., according to the operations shown in FIG. 11. At block 402, a dependent UI control 222 that enables a selection of values at corresponding locations along a track 230 defined by the dependent UI control 222 can be presented. With the first UI control 122 and the dependent UI control 222 presented in this way, at block 404, the UI 20 can detect a selection made in the first UI control 122 (e.g., to allocate proportions of Z to X and Y), so as to adjust at least one value associated with the dependent UI control 222 at block 406, according to the selection made in the first UI control 122. This effect is illustrated in FIG. 14, described above.

More broadly, a UI 20 may include any plurality of UI controls 22, each of which may operate independently of other UI controls 22 or may be dependent on one or more other UI controls 22. For example, sets of UI controls 22 can be grouped together. Similarly, a collection of UI controls 22 may be presented, with groups and/or sub-groups within the collection. Such groups or sub-groups of UI controls 22 may be dependent on other groups or sub-groups, be dependent on individual UI controls 22, or be completely independent of each other. For example, a first UI control 22 may be presented with a group of dependent UI controls 22 linked to the first UI control such that one or more of the individual dependent UI controls 22 in the group are affected by an input made in the first UI control 22.

Figure 16:
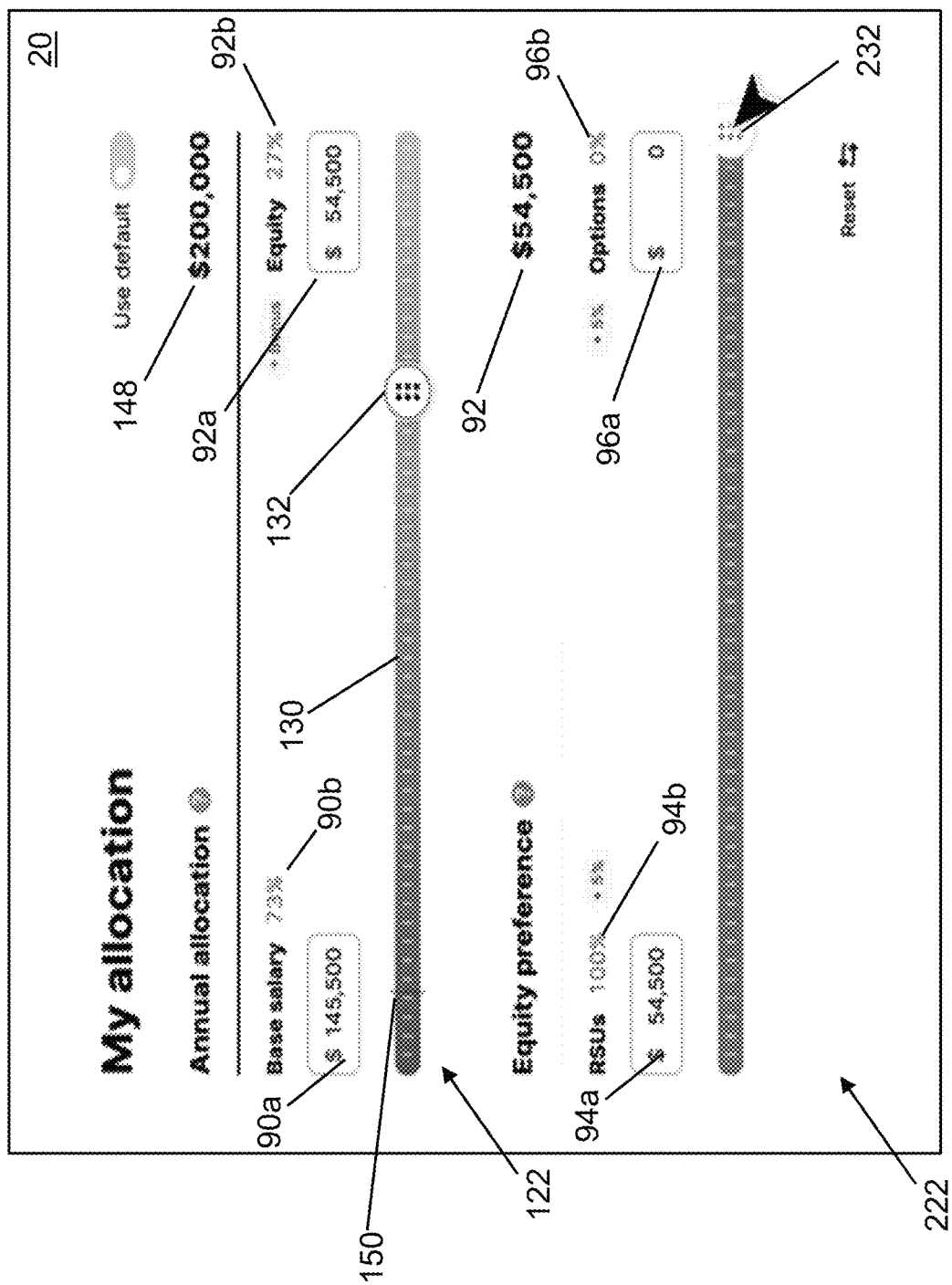
FIG. 16 shows an example of a UI having multiple slider UI controls.

FIG. 16 illustrates an example implementation of the multiple slider UI controls 122, 222 shown in FIG. 14, configured for allocating proportions of an employee's compensation 148 between salary 90*a* and equity 92*a*. In such an implementation, the manipulable portion 34 of the UI control may be user- or item-specific, e.g., in the case of employee compensation. In such a case, a user with a higher compensation may be disadvantaged by linearly spaced guardrails as a greater set of values are placed into the same manipulable portion as those with a lower compensation total and thus the non-proportionate scaling described herein can be applied, in this example to multiple slider UI controls 122, 222. In FIG. 16, reference numerals from FIG. 14 are repeated to illustrate the application of the allocation example to the multiple slider UI control 122, 222 configuration introduced in FIG. 14. The selector 132 can be moved along the track 130 as discussed above, to change the proportions 90*b* and 92*b* and corresponding numerical salary and equity values 90*a*, 92*a*. As illustrated, as the position of the selector 132 moves towards the right, the proportion of the base salary increases and when moved towards the left, the proportion of the base salary decreases while the equity portion increases. A guardrail 150 is provided towards the base salary portion of the track 130 to represent a lower limit on the proportion 90*b* or value 90*a* that can be attributed to base salary, e.g., to provide a minimum living wage as a mandate or other measure such as a regulatory or policy requirement. The second dependent slider UI control 222 in this example is associated with which value 92*a* is attributed to equity based on the selection made in the first slider UI control 122. In this example, the dependent slider UI control 222 is set at the full amount of equity 92*a* selected using the first slider UI control 122 towards restricted stock units (RSUs) 94*a* with zero being attributed to options 96*a*. This initial position for the selector 232 may be provided as a default and can be adjusted to the left to decrease the proportion 94*b* attributed to RSUs 94*a* and to increase the proportion 96*b* attributed to options 96*a*.

The UI 20 shown in FIG. 16 can be provided in an application 12 provided to users 18 as a tool to make selections, such as in this example, for allocating compensation. The presentation of multiple units in the same multi-slider UI control 122, 222 provides an intuitive interactive experience to users 18 as the values 90*a*/90*b*, 92*a*/92*b*, 94*a*/94*b*, 96*a*/96*b* can be dynamically updated and displayed to the user 18 as selections are made using the sliders 132, 232. Moreover, the provision of text entry boxes provides further granularity and control over the selections to provide an improved user experience when compared to proportionate allocation of manipulable and non-manipulable portions 34, 36. Additionally, non-proportionate spacing of guardrails 50, 52 allows the UI control 22 to be presented using less screen space, which may allow additional UI controls 22 or other UI elements to be included in the UI 20, without sacrificing usability of the UI controls 22. The inclusion of limits 40, 44 and guardrail 150 also allows the system providing the UI 20 to impose restrictions or boundaries on the selections to further enhance the intuitive nature of the interaction, since, for example, a user can immediately visualize how the guardrail 150 affects their ability to allocate the total value Z to, in this case, the leftmost value (X), namely the base salary in the allocation example of FIG. 16. The guardrails 150 and values defining the range of values and proportions available to each unit can be controlled by the system using user-specific data such that a module or engine (utilizing a processor 302) used to generate the guardrails 150 and values Z, X, and Y can adapt the UI control 22 to a particular scenario, item, or user.

Figure 17:
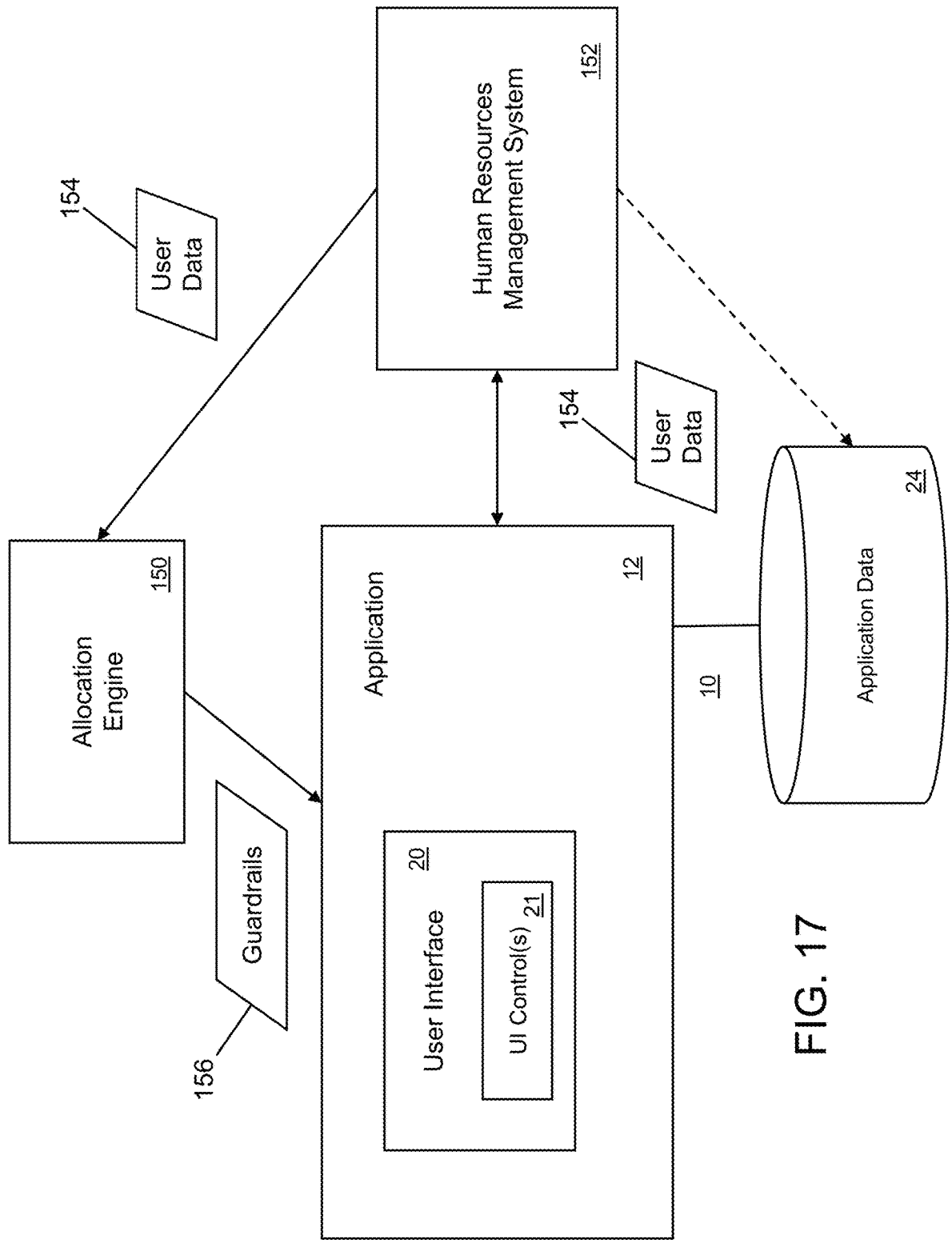
FIG. 17 is a block diagram illustrating an example of a configuration for an application integrated with a human resources management system.

Referring now to FIG. 17, the computing environment 10 is illustrated with the application 12 and UI 20 being coupled to a human resources management system (HRMS) 152, e.g., within an enterprise environment. The HRMS 152 can be accessed to obtain user data 154 to determine the range of values, default allocations, limits and other contextual or profile data concerning an employee. That is, the application 12 in this example provides a compensation selection feature, using the UI 20 and UI control(s) 21 such as the primary/secondary slider UI controls 122, 222 shown in FIGS. 14 and 16. The HRMS 152 can also be coupled to an allocation engine 150, which determines the guardrails 156 based on the user data 154. It can be appreciated that the application 12 and allocation engine 150 are shown separately in FIG. 17 for ease of illustration and could instead be integrated into the same computing entity. The allocation engine 150 can be used to obtain the user data 154 and to generate the guardrails 156 in order to adapt the application 12 to an organization, employee, or user 18. The components shown in FIG. 17 can be part of the same computing device within the computing environment 10 or can be connected to each other using communication network access, via internal and/or external network connectivity. Such communication network(s) may include a telephone network, cellular, and/or data communication network to connect different types of client- and/or server-type devices. For example, the communication network may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

It can be appreciated that the interconnected configuration between the application 12 and a separate system such as the HRMS 152 can be applied to other enterprise or other systems, for example to permit a user to make selections in a banking or insurance application, or to select options for a service provided by a service provider.

Figure 18:
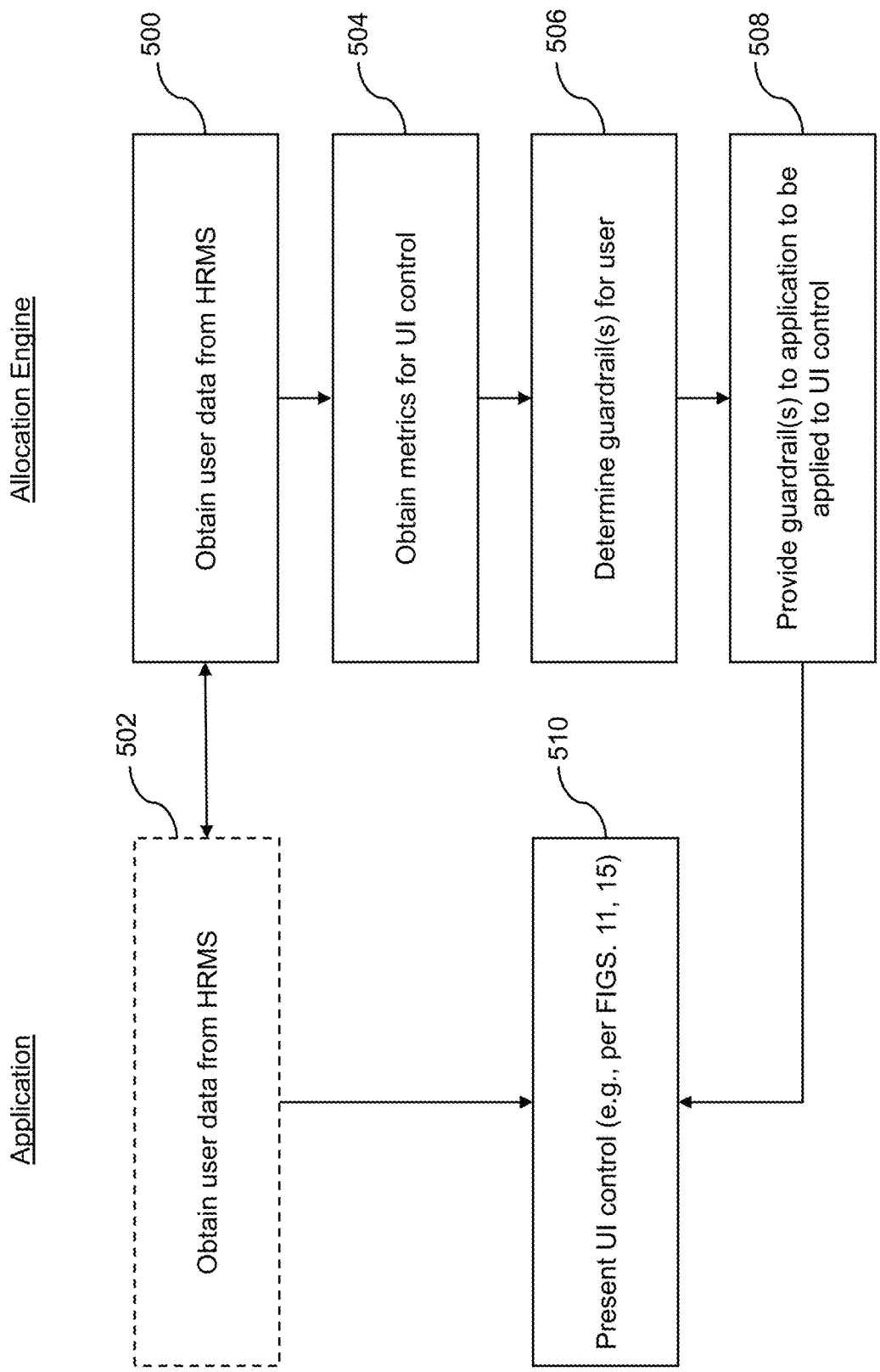
FIG. 18 is a flow chart illustrating example operations for communicating with an allocation engine to present a UI control using data obtained from a human resources management system.

FIG. 18 illustrates a set of operations that can be executed in communicating with an allocation engine 150 to present a UI control 22 using data obtained from an HRMS 152. At block 500, the allocation engine obtains user data 154 from the HRMS 152. The application 12 may also obtain such user data 154 at block 502, either directly from the HRMS 152 or via the allocation engine 150. The allocation engine 150 may then obtain metrics for the UI control 22 at block 504, e.g., constraints on values that can be selected or should not be selected. At block 506, the allocation engine 150 determines the guardrails 144, if any, and provides the guardrails 144 to the application 12 to be applied to the U control 21 in the UI 20 at block 508.

At block 510, the application 12 presents the UI control 21, e.g., per FIG. 11 or 15, which uses the user data 154 and guardrails 144 (if any). It can be appreciated that as illustrated in dashed lines, the allocation engine 150 can be responsible for determining both the user-related information and guardrails to the application 12, e.g., by integrating with the HRMS 152 and/or providing a connection into the HRMS 152 for the application 12, e.g., via an application programming interface (API) or developer's toolkit, etc.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, engine 150, system 152, any device or component thereof or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method comprising:
presenting a user interface control, the user interface control extending as a first extent between a first display position and a second display position and defining a track, the first extent of the track corresponding to a range of values, the user interface control maintaining a manipulable portion of the track and a non-manipulable portion of the track during manipulation of the user interface control, wherein a selector is movable along the track within the manipulable portion to select a value within an allowable subrange of the range of values, the allowable subrange based on a limit defining a second extent of the allowable subrange and the non-manipulable portion corresponding to a portion of the range of values beyond the limit, wherein values outside the allowable subrange of values are maintained in the non-manipulable portion while the selector is moved along the track within the manipulable portion and the values are represented by the non-manipulable portion using a different scale than the allowable subrange of the range of values in the manipulable portion, and wherein the different scale corresponds to a discontinuity in functions used to define an incrementation of values on either side of the limit;

presenting a dependent user interface control, the dependent user interface control extending as a third extent between a third display position and a fourth display position and defining a second track, the third extent of the second track corresponding to a second range of values, the dependent user interface control enabling selection of values in the second range of values at corresponding locations along the second track defined using a second selector; and adjusting at least one value defining the second range of values of the dependent user interface control according to a selection made in the user interface control using the selector.

2. The method of claim 1, further comprising presenting the non-manipulable portion continuous with the manipulable portion and separated by a visual element identifying the limit.

3. The method of claim 1, wherein the manipulable portion of the user interface control comprises a minimum proportion of the track dedicated to the allowable subrange of the range of values.

4. The method of claim 3, wherein the minimum proportion is determined according to a maximum proportion allocated to the non-manipulable portion.

5. The method of claim 3, wherein the minimum proportion is determined according to a type of value being represented.

6. The method of claim 1, wherein the limit is a lower limit.

7. The method of claim 1, wherein the limit is an upper limit.

8. The method of claim 1, further comprising determining at least one additional limit, wherein the manipulable portion is displayed between a pair of limits.

9. The method of claim 8, wherein a first limit of the pair of limits comprises a lower limit and a second limit of the pair of limits comprises an upper limit.

10. The method of claim 1, wherein the user interface control is a slider-type user interface control comprising a slider element provided as the selector.

11. The method of claim 1, further comprising:
detecting a selection within the non-manipulable portion;
displaying an alert associated with the selection; and
enabling values outside the limit to be selected in response to detecting an acknowledgement of the alert.

12. The method of claim 11, wherein the non-manipulable portion is resized to facilitate selection of the values outside the limit.

13. The method of claim 1, wherein the dependent user interface control has a second manipulable portion and a second non-manipulable portion, and wherein the second selector is movable along the second track within the second manipulable portion to select a second value within a second allowable subrange of the second range of values, the second allowable subrange based on a second limit defining a fourth extent of the second allowable subrange and the second non-manipulable portion corresponding to the second range of values beyond the second limit.

14. The method of claim 1, wherein the at least one value defining the second range of values comprises an upper limit dictated by the selection made in the user interface control.

15. The method of claim 1, wherein the range of values corresponds to compensation over a period of time, and selections made within the manipulable portion adjust an allocation of the compensation between a plurality of types of compensation.

16. The method of claim 15, wherein the allocations are presented and updated as selections are made within the manipulable portion.

17. The method of claim 15, wherein: the dependent user interface control enables a sub-allocation of a type of compensation to be adjusted and comprising:
adjusting the sub-allocation according to a selection made in the dependent user interface control.

18. The method of claim 1, wherein the range of values corresponds to a metered value.

19. The method of claim 18, wherein the metered value comprises any one of a temperature, a pressure, an audio control, a speed, a physical dimension, an airflow, a unit of mass, or a unit of energy.

20. A system comprising:
a processor;
a display coupled to the processor;
at least one input device coupled to the processor; and
at least one memory, the at least one memory comprising processor executable instructions that, when executed by the at least one processor, causes the system to:
present a user interface control, the user interface control extending as a first extent between a first display position and a second display position and defining a track, the first extent of the track corresponding to a range of values, the user interface control maintaining a manipulable portion of the track and a non-manipulable portion of the track during manipulation of the user interface control,
wherein a selector is movable along the track within the manipulable portion to select a value within an allowable subrange of the range of values, the allowable subrange based on a limit defining a second extent of the allowable subrange and the non-manipulable portion corresponding to a portion of the range of values beyond the limit, wherein values outside the allowable subrange of values are maintained in the non-manipulable portion while the selector is moved along the track within the manipulable portion and the values are represented by the non-manipulable portion using a different scale than the allowable subrange of the range of values in the manipulable portion, and wherein the different scale corresponds to a discontinuity in functions used to define an incrementation of values on either side of the limit;
present a dependent user interface control, the dependent user interface control extending as a third extent between a third display position and a fourth display position and defining a second track, the third extent of the second track corresponding to a second range of values, the dependent user interface control enabling selection of values in the second range of values at corresponding locations along the second track defined using a second selector; and adjust at least one value defining the second range of values of the dependent user interface control according to a selection made in the user interface control using the selector.

21. The system of claim 20, wherein the dependent user interface control has a second manipulable portion and a second non-manipulable portion, and wherein the second selector is movable along the second track within the second manipulable portion to select a second value within a second allowable subrange of the second range of values, the second allowable subrange based on a second limit defining a fourth extent of the second allowable subrange and the second non-manipulable portion corresponding to the second range of values beyond the second limit.

22. The system of claim 20, wherein the at least one value defining the second range of values comprises an upper limit dictated by the selection made in the user interface control.

23. A non-transitory computer-readable medium comprising processor executable instructions that, when executed by a processor, cause the processor to:

present a user interface control, the user interface control extending as a first extent between a first display position and a second display position and defining a track, the first extent of the track corresponding to a range of values, the user interface control maintaining a manipulable portion of the track and a non-manipulable portion of the track during manipulation of the user interface control, wherein a selector is movable along the track within the manipulable portion to select a value within an allowable subrange of the range of values, the allowable subrange based on a limit defining a second extent of the allowable subrange and the non-manipulable portion corresponding to a portion of the range of values beyond the limit, wherein values outside the allowable subrange of values are maintained in the non-manipulable portion while the selector is moved along the track within the manipulable portion and the values are represented by the non-manipulable portion using a different scale than the allowable subrange of the range of values in the manipulable portion, and wherein the different scale corresponds to a discontinuity in functions used to define an incrementation of values on either side of the limit;

the dependent user interface control extending as a third extent between a third display position and a fourth display position and defining a second track, the third extent of the second track corresponding to a second range of values, the dependent user interface control enabling selection of values in the second range of values at corresponding locations along the second track defined using a second selector; and adjust at least one value defining the second range of values of the dependent user interface control according to a selection made in the user interface control using the selector.

\* \* \* \* \*